US 7,848,009 B2

(12) United States Patent
Machida et al.

(10) Patent No.: US 7,848,009 B2
(45) Date of Patent: Dec. 7, 2010

(54) IMAGE DISPLAY MEDIUM AND IMAGE DISPLAY DEVICE

(75) Inventors: Yoshinori Machida, Kanagawa (JP); Hiroaki Moriyama, Kanagawa (JP); Yasufumi Suwabe, Kanagawa (JP); Masaaki Abe, Kanagawa (JP); Satoshi Tatsuura, Kanagawa (JP); Yoshinori Yamaguchi, Kanagawa (JP); Hiroshi Kayashima, Kanagawa (JP); Kiyoshi Shigehiro, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 180 days.

(21) Appl. No.: 12/343,661

(22) Filed: Dec. 24, 2008

(65) Prior Publication Data
US 2010/0020384 A1  Jan. 28, 2010

(30) Foreign Application Priority Data
Jul. 28, 2008 (JP) .............................. 2008-193188

(51) Int. Cl.
*G02B 26/00* (2006.01)
*G09G 3/34* (2006.01)
(52) U.S. Cl. ....................................... 359/296; 345/107
(58) Field of Classification Search .................. 359/296; 345/107; 430/32; 204/600
See application file for complete search history.

(56) References Cited

U.S. PATENT DOCUMENTS 4,806,443 A   2/1989   Yanus et al.
7,609,435 B2 * 10/2009 Moriyama et al. .......... 359/296
2008/1003673        2/2008   Shigehiro et al.

FOREIGN PATENT DOCUMENTS

| JP | A-7-325434 | 12/1995 |
| JP | A-10-3177 | 1/1998 |
| JP | A-2006-36877 | 2/2006 |
| JP | A-2006-58901 | 3/2006 |
| JP | A-2006-343457 | 12/2006 |
| JP | A-2007-249188 | 9/2007 |
| JP | A-2008-122468 | 5/2008 |
| WO | WO 99/10767 | 3/1999 |
| WO | WO 99/10768 | 3/1999 |
| WO | WO 99/10769 | 3/1999 |

* cited by examiner

*Primary Examiner*—William C Choi
(74) *Attorney, Agent, or Firm*—Oliff & Berridge, PLC

(57) ABSTRACT

An image display medium includes a pair of substrates, a liquid that is enclosed between the substrates, first colored particles, second colored particles and third colored particles. The first colored particles are colored a first color and move in response to an electric field that is formed between the substrates. The second colored particles are colored a second color and move in an opposite direction of the first colored particles. The third colored particles are colored a third color, are configured to have a particle diameter such that the third colored particles move through clearances between the first colored particles and the second colored particles in a state in which the first colored particles and the second colored particles have aggregated together, and move in response to an electric field that is formed between the substrates.

36 Claims, 12 Drawing Sheets

ROUGH DOTTED LINE: FIRST COLORED PARTICLES
ONE-DOTTED CHAIN LINE: SECOND COLORED PARTICLES
TWO-DOTTED CHAIN LINE: THIRD COLORED PARTICLES
FINE DOTTED LINE: FOURTH COLORED PARTICLES

DISPLAY DENSITY

ROUGH DOTTED LINE: FIRST COLORED PARTICLES
TWO-DOTTED CHAIN LINE: THIRD COLORED PARTICLES
FINE DOTTED LINE: FOURTH COLORED PARTICLES

IMAGE DISPLAY MEDIUM AND IMAGE DISPLAY DEVICE

CROSS-REFERENCE TO RELATED APPLICATION

This application is based on and claims priority under 35 USC 119 from Japanese Patent Application No. 2008-193188 filed Jul. 28, 2008.

BACKGROUND

1. Technical Field

The present invention relates to an image display medium and an image display device.

2. Related Art

Conventionally, an image display medium that uses colored particles is known as an image display medium that has memorability and is capable of being repeatedly rewritten. This image display medium is, for example, configured to include a pair of substrates and plural types of particle groups that are enclosed between the substrates so as to be movable between the substrates by an applied electric field and whose colors and charging characteristics are different. Further, there are also cases where a spacing member for partitioning the space between the substrates into plural cells is disposed between the substrates for reasons such as preventing the particles from becoming disproportionate in part of a region inside of the substrates.

In this image display medium, a voltage corresponding to an image is applied between the pair of substrates, whereby the particles are caused to move and an image is displayed as the contrast of the particles of different colors. It will be noted that, even after application of the voltage is stopped, the particles continue to adhere to the substrates because of the van der Waals force and image force, and image display is maintained.

SUMMARY

The present invention provides an image display medium and an image display device that perform color display where color mixing is controlled.

According to an aspect of the present invention, an image display medium includes: a pair of substrates, at least one of which is translucent; a liquid that is enclosed between the substrates; first colored particles that are colored a first color, are dispersed in the liquid, and move in response to an electric field that is formed between the substrates; second colored particles that are colored a second color that is different from the first color, are dispersed in the liquid, and move in an opposite direction of the first colored particles; and third colored particles that are colored a third color that is different from the first color and the second color, are dispersed in the liquid, are configured to have a particle diameter such that the third colored particles move through clearances between the first colored particles and the second colored particles in a state where the first colored particles and the second colored particles have aggregated together, and move in response to an electric field that is formed between the substrates.

BRIEF DESCRIPTION OF THE DRAWINGS

Exemplary embodiments of the present invention will be described in detail based on the following figures, wherein.

DETAILED DESCRIPTION

Figure 1:
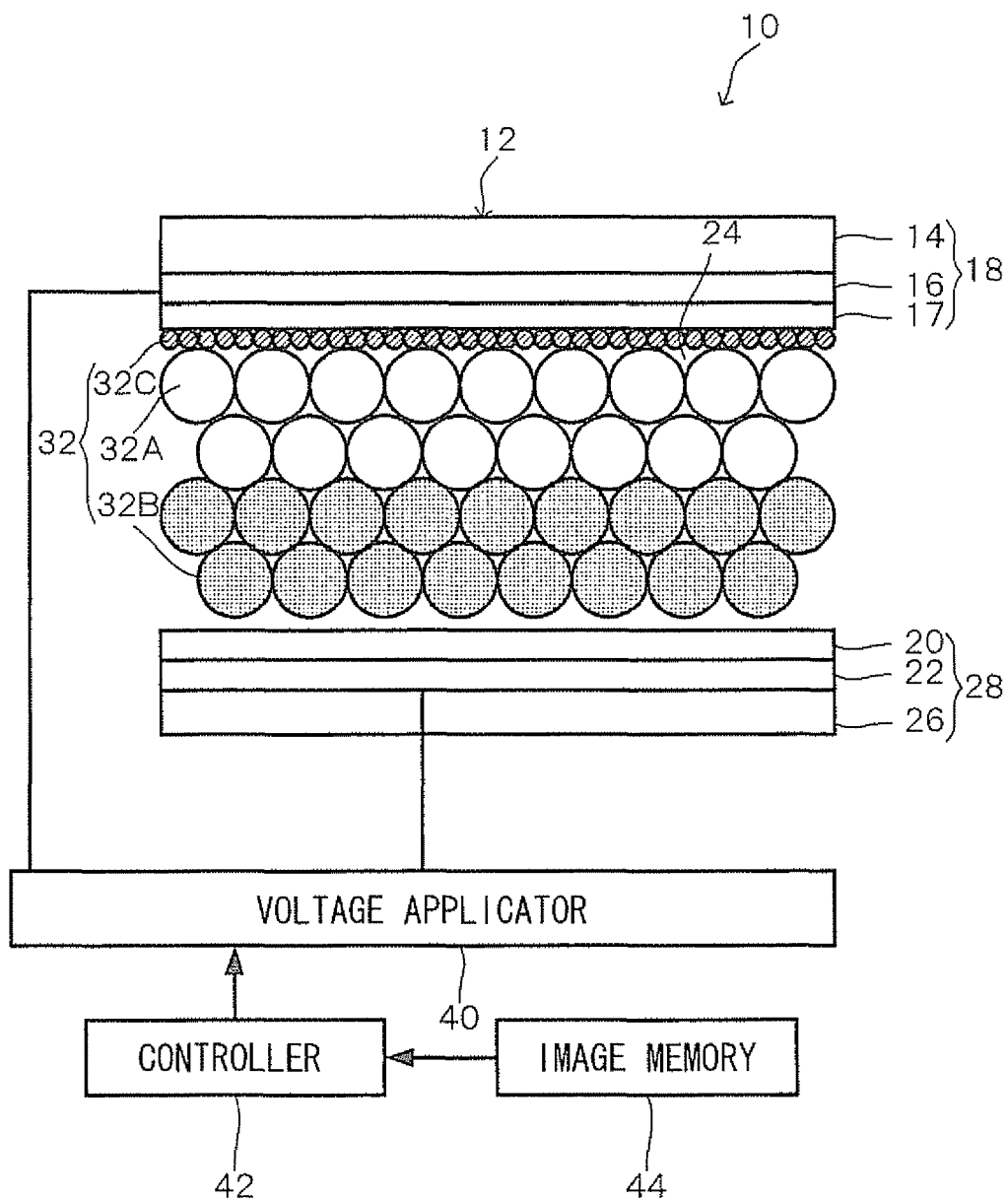
FIG. 1 is a general configural diagram showing an image display device pertaining to a first exemplary embodiment of the present invention.

Below, examples of exemplary embodiments of the present invention will be described in detail with reference to the drawings. It will be noted that, in regard to members having substantially the same functions, the same reference numerals will be given through all of the drawings and sometimes redundant description will be omitted.

First Exemplary Embodiment

FIG. 1 is a general configural diagram showing an image display device 10 pertaining to a first exemplary embodiment of the present invention. It will be noted that FIG. 1 is a showing an example where the image display device 10 displays red.

As shown in FIG. 1, the image display device 10 pertaining to the first exemplary embodiment of the present invention is configured to include an image display medium 12 that displays an image by the movement of later-described colored particles 32 (first to third colored particles 32A to 32C) and a controller 42 that receives an image display instruction from an external image signal output device such as a personal computer or the like and controls the driving of a voltage applicator 40 on the basis of image data stored in an image memory 44.

The image display medium 12 is configured to include a translucent display substrate 18 that is configured as an image display surface and a back substrate 28 that is disposed facing the display substrate 18, with a predetermined clearance being intervened between the display substrate 18 and the back substrate 28. It will be noted that the image display medium 12 may also include a spacing member that partitions that space between the display substrate 18 and the back substrate 28 into plural cells. In this case, the cells are regions enclosed by the display substrate 18, the back substrate 28 and the spacing member. Further, the spacing member may be disposed so as to correspond to each pixel when an image is displayed on the image display medium 12, or may be disposed so as to include plural pixels, or may be disposed to as to divide one pixel into plural cells.

A translucent dispersion liquid 24 is enclosed between the display substrate 18 and the back substrate 28, and three types of colored particles 32 (first colored particles 32A, second colored particles 32B and third colored particles 32C) are enclosed in the dispersion liquid 24. Each of the colored particles moves in response to the intensity of an electric field that is formed between the substrates. It will be noted that the "translucent" referred to above means that transmittance of visible light is equal to or greater than 70% and preferable equal to or greater than 90%.

The display substrate 18 has a configuration where a surface electrode 16 and a surface layer 17 are laminated in order on a support substrate 18. The back substrate 28 has a configuration where a back electrode 22 and a surface layer 20 are laminated in order on a support substrate 26.

Examples of the support substrates 14 and 26 may include glass and plastic exemplified by polycarbonate resin, acrylic resin, polyimide resin, polyester resin, epoxy resin, and polyethersulfone resin.

For the surface electrode 16 and the back electrode 22, an oxide such as indium, tin, cadmium or antimony, a composite oxide such as ITO, a metal such as gold, silver, copper or nickel, or an organic material such as polypyrrole or polythiophene can be used. These can be formed in a single layer film or a composite film or in a composite film by vapor deposition, sputtering or coating. Further, the thickness is ordinarily about 100 to 2000 angstroms according to vapor deposition or sputtering. As for the surface electrode 16 and the back electrode 22, an intended pattern can be formed by conventionally well-known means such as etching of a conventional liquid crystal display element or a printed board. The surface electrode 16 and the back electrode 22 can, for example, be formed in an arbitrary segmented shape or in a striped shape that enables passive matrix driving.

It will be noted that the surface electrode 16 may also be embedded in the support substrate 14 and that, similarly, the back electrode 22 may also be embedded in the support substrate 26. In this case, sometimes the material of the support substrates 14 and 26 exerts affects on the electrical characteristics or the magnetic characteristics and the fluidity of the colored particles 32, so it is necessary to select the material of the support substrates 14 and 26 in accordance with the composition and the like of the particles.

Further, each of the surface electrode 16 and the back electrode 22 may also be divided from the display substrate 18 and the back substrate 28 and disposed outside the image display medium 12. In the present exemplary embodiment, a case is described where the image display medium 12 is disposed with electrodes (the surface electrode 16 and the back electrode 22) on both the display substrate 18 and the back substrate 28, but the image display medium 12 may also be configured such that an electrode is disposed on just either one.

Further, in order to enable active matrix driving, the support substrates 14 and 26 may also be disposed with a TFT (Thin Film Transistor) per pixel. In this case, wire lamination and component mounting are easy, so it is preferable for the TFTs to be formed on the back substrate 28 rather than on the display substrate 18.

It will be noted that, when the image display medium 12 is simply matrix-driven, the configuration of the image display device 10 can be made into a simple configuration, and when the image display medium 12 is configured to use active matrix driving using TFTs, the display speed can be increased in comparison to simple matrix driving.

Further, when the surface electrode 16 and the back electrode 22 are respectively formed on the support substrates 14 and 26, it is preferable to form a surface layer in the form of a dielectric film respectively on the surface electrode 16 and the back electrode 22 as needed in order to prevent breakage of the surface electrode 16 and the back electrode 22 and the occurrence of a leak between the electrodes that leads to fixing of the colored particles 32. As the material that forms this surface layer, polycarbonate, polyester, polystyrene, polyimide, epoxy, polyisocyanate, polyamide, polyvinyl alcohol, polybutadiene, polymethylmethacrylate, copolymer nylon, ultraviolet curable acrylic resin, or fluororesin can be applied.

As the material that forms the dielectric film, in addition to the aforementioned materials, a material where a charge-transporting substance is included in this material can be used. Examples of the charge-transporting substance may include a hydrazone compound, a stilbene compound, a pyrazoline compound or an arylamine compound, which are hole-transporting substances. Further, a fluorenone compound, a diphenoquinone derivative, a pyran compound or zinc oxide, which are electron-transporting substances, can also be used. Moreover, a charge-transporting self-supporting resin can also be used. Specifically, examples thereof may include polyvinyl carbazole or the polycarbonate resulting from polymerization of a specific dihydroxy arylamine and a bis-chloroformate described in U.S. Pat. No. 4,806,443. Further, sometimes the surface layer in the form of a dielectric film has an influence on the charging characteristics and the fluidity of the colored particles 32, so it is necessary to select in accordance with the composition and the like of the colored particles 32.

Further, it is necessary for the display substrate 18 that configures the image display medium 12 to be translucent as mentioned above, so each of the above-described materials that is translucent is used.

In a case where a spacing member is used, the spacing member can be formed by a thermoplastic resin, a thermosetting resin, an electron beam curable resin, a light curable resin, a rubber or a metal. Further, the spacing member may also be integrated with either one of the display substrate 18 and the back substrate 28. In this case, the spacing member can be manufactured by etching that etches either one of the support substrates 14 and 26, laser machining, or press working using a mold that has been manufactured beforehand.

Further, the spacing member can also be manufactured by using a printing system or inkjet system. It will be noted that the spacing member can be manufactured on at least one of the display substrate 18 side or the back substrate 28 side. Further, the spacing member may be colored or colorless, but it is preferable for the spacing member to be achromatic or colorless and transparent in order to ensure that the spacing member does not adversely affect the display image that is displayed on the image display medium 12; in this case, for example, a transparent resin or the like such as polystyrene, polyester or acrylic can be used.

It is preferable for the dispersion medium 28 in which the colored particles 32 are dispersed to be a high-resistance liquid. Here, "high-resistance" means that its volume resistivity is equal to or greater than 107 Ω·cm, preferably equal to or greater than 1010 Ω·cm, and more preferably equal to or greater than 1012 Ω·cm.

As the high-resistance liquid, specifically, hexane, cyclohexane, toluene, xylene, decane, hexadecane, paraffin, isoparaffin, silicone oil, dichloroethylene, trichloroethylene, perchloroethyelene, high-purity oil, benzene, diisopropyl naphthalene, olive oil, trichlorotrifluoroethane, tetrachloroethane, dibromotetrafluoroethane, and mixtures of those can be preferably used.

It will be noted that an acid, an alkali, a salt, a dispersion stabilizer, a stabilizer for the purpose of oxidation prevention or ultraviolet absorption, an antimicrobial and an antiseptic can be added as needed to the high-resistance liquid, but it is preferable for these to be added such that they are within the range of the specific volume resistivity values indicated above.

Further, as a charging controller, an anionic surfactant, a cationic surfactant, an amphoteric surfactant, a nonionic surfactant, a fluorochemical surfactant, a silicone surfactant, a metal soap, an alkyl phosphate ester and an imide succinate can be added to the high-resistance liquid and used.

As the ionic and nonionic surfactants, more specific examples may include the following. Examples of the nonionic surfactant may include polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylene sorbitan fatty acid ester, and fatty acid alkanolamide. Examples of the anionic surfactant may include alkyl benzene sulfonate, alkyl phenyl sulfonate, alkyl naphthalene sulfonate, higher fatty acid salt, sulfates of higher fatty acid esters, and sulfonates of higher fatty acid esters. Examples of the cationic surfactant may include primary to tertiary amine acids and quaternary ammonium salt. It is preferable for these charging controllers to be equal to or greater than 0.01% by weight and equal to or less than 20% by weight with respect to the particle solid content, and a range of about 0.05% by weight and equal to or less than 10% by weight is particularly preferable. When these charging controllers are less than 0.01% by weight, the desired charging controlling effect is insufficient, and when these charging controllers exceed 20% by weight, this triggers an excessive rise in the conductivity of the dispersion liquid.

Examples of the particles of the colored particles 32 that are dispersed in the dispersion liquid 28 may include glass beads, alumina, metal oxide particles such as titanium oxide, thermoplastic or thermosetting resin particles, particles where a colorant has been fixed to the surfaces of these resin particles, particles that include a colorant in thermoplastic or thermosetting resin, and metal colloid particles that has a plasmon coloring function.

As the thermosetting resin that is used in the manufacture of the particles, there can be exemplified homopolymers and copolymers of styrenes such as styrene and chlorostyrene, monolefins such as ethylene, propylene, butylenes and isoprene, vinyl esters such as vinyl acetate, vinyl propionate, vinyl benzoate, and vinyl butyrate, α-methylene aliphatic monocarboxylic acid esters such as methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate, vinyl ethers such as vinyl methyl ether, vinyl ethyl ether, and vinyl butyl ether, and vinyl ketones such as vinyl methyl ketone, vinyl hexyl ketone, and vinyl isopropenyl ketone.

Further, examples of the thermosetting resin that is used in the manufacture of the particles can include a cross-linked resin such as a cross-linked copolymer or a cross-linked polymethyl methacrylate whose main component is divinylbenzene, phenol resin, urea-formaldehyde resin, melamine resin, polyester resin, or silicone resin. Particularly representative bonding resins can include polystyrene, styrene-alkyl acrylate copolymer, styrene-alkyl methacrylate copolymer, styrene-acrylonitrile copolymer, styrene-butadiene copolymer, styrene-maleic anhydride copolymer, polyethylene, polypropylene, polyester, polyurethane, epoxy resin, silicone resin, polyamide, modified rosin, and paraffin wax.

As the colorant, an organic or inorganic pigment or an oil-soluble dye can be used, magnetic powder such as magnetite or ferrite and publicly known colorants such as carbon black, titanium oxide, magnesium oxide, zinc oxide, phthalocyanine copper cyan color material, azo yellow color material, azo magenta color material, quinacridone magenta color material, red color material, green color material, and blue color material can be listed. Specifically, aniline blue, carcoil blue, chrome yellow, ultramarine blue, Du Pont oil red, quinoline yellow, methylene blue chloride, phthalocyanine blue, malachite green oxylate, lampblack, rose bengal, C.I. pigment red 48:1, C.I. pigment red 122, C.I. pigment red 57:1, C.I. pigment yellow 97, C.I. pigment blue 15:1, and C.I. pigment blue 15:3 can be representatively exemplified.

A charge control agent may also be mixed in with the particle resin as needed. As the charge control agent, a publicly known charge control agent that is used in electrophotographic toner material can be used; examples thereof can include cetyl pyridyl chloride, tertiary ammonium salts such as BONTRON P-51, BONTRON P-53, BONTRON E-84 and BONTRON E-81 (manufactured by Orient Chemical Industries, Ltd.), salicylic acid metal complexes, phenol condensates, tetraphenyl compounds, metal oxide particles, and metal oxide particles that have been surface-treated by various types of coupling agents.

An external additive may also be adhered as needed to the surfaces of the particles. It is preferable for the color of the external additive to be transparent so as not to affect the color of the particles. As the external additive, there are used inorganic particles of metal oxides such as silicon oxide (silica), titanium oxide, and alumina. In order to adjust the charging properties, fluidity and environmental dependency of the particles, these can be surface-treated by a coupling agent or silicone oil. Examples of the coupling agent include those having positive charging properties, such as aminosilane-based coupling agents, aminotitanium-based coupling agents, and nitril-based coupling agents, and those having negative charging properties, such as nitrogen-free (composed of atoms other than nitrogen) silane-based coupling agents, titanium-based coupling agents, epoxy silane coupling agents, and acrylsilane coupling agents. Further, examples of the silicone oil include those having positive charging properties, such as amino-denatured silicone oil, and those having negative charging properties, such as dimethyl silicone oil, alkyl-denatured silicone oils, α-methyl sulfone-denatured silicone oils, methylphenyl silicone oils, chlorphenyl silicone oils, and fluorine-denatured silicone oils.

Among these external additives, well-known hydrophobic silica and hydrophobic titanium oxide are preferred, and titanium compounds as described in JP-A No. 10-3177, which are obtained by the reaction between TiO(OH)2 and a silane compound such as a silane coupling agent, are particularly preferred. As the silane compound, it is possible to use any type of chlorosilane, alkoxy silane, silazane, and special silylating agents. The titanium compound is produced by reacting TiO(OH)2 prepared by wet process with a silane compound or silicone oil, and drying. As the compound does not pass through a sintering process at several hundred degrees, strong bonds between the Ti molecules do not form, there is no agglutination at all, and the particles are in a primary particle state. Moreover, as TiO(OH)2 is directly reacted with a silane compound or silicone oil, the processing amount of the silane compound or the silicone oil can be increased, the charging characteristics can be controlled by adjusting the processing amount or the like of the silane compound, and the charging ability that can be imparted can be remarkably improved over that of conventional titanium oxide.

The primary particles of the external additive are generally about 5 to 100 nm and more preferably about 10 to 50 nm but are not limited thereto.

The mixing ratio between the external additive and the particles is adjusted in consideration of the particle diameter of the particles and the particle diameter of the external additive. When the added amount of the external additive is too much, some of the external additive separates from the particle surfaces and adheres to the surfaces of other particles such that the desired charging characteristics are no longer obtained. Usually, the amount of the external additive is about 0.01 to 3 parts by weight or more preferably about 0.05 to 1 parts by weight with respect to 100 parts by weight of the particles.

The external additive may be added to just one type of the plural types of particles or may be added to several types or to all types of the particles. When the external additive is added to the surfaces of all the particles, it is preferable to strongly fix the external additive to the surfaces of the particles by driving the external additive into the particle surfaces with an impact force or by heating the particle surfaces. Thus, a situation in which the external additive separates from the particles and external additives of opposite polarities strongly agglutinate and form aggregates of the external additive that are difficult to dissociate by an electric field is prevented. Therefore, image deterioration is prevented.

As the method of preparing the colored particles 32, any conventionally known method may be used. For example, as described in JP-A No. 7-325434, there can be used a method where a resin, a pigment and a charge control agent are weighed so as to prepare a predetermined mixing ratio, and the resin is heated and melted, whereafter the pigment is added, mixed, dispersed and cooled. Thereafter, particles are prepared using a mill such as a jet mill, a hammer mill or a turbo mill and, thereafter, the obtained particles are dispersed in a dispersion medium. Further, particles containing a charge control agent may also be prepared by a polymerization method such as suspension polymerization, emulsion polymerization or dispersion polymerization, or by a method such as coacervation, melt dispersion or emulsion aggregation, whereafter the particles may be dispersed in a dispersion medium to obtain a particle dispersion medium. Moreover there is a method that uses an appropriate device that can disperse and mix raw materials including a resin, a colorant, a charge control agent and a dispersion medium at a temperature at which the resin is plasticizable, the dispersion medium does not boil, and which is lower than the decomposition point of the resin, the charge control agent and/or the colorant. Specifically, the pigment, the resin and the charge control agent are heated and melted in a dispersion medium by a shooting star-type mixer or a kneader, the temperature dependency of the solvent solubility of the resin is utilized, and the melted mixture is stirred, cooled and allowed to coagulate and deposit such that the particles can be manufactured.

The size (volume average particle diameter) of each of the particles of the first colored particles 32A and the second colored particles 32B is configured to be a size where the third colored particles 32C are capable of moving through clearances between the first colored particles 32A and the second colored particles 32B. Consequently, it is desirable for the size of the first colored particles 32A and the second colored particles 32B to be equal to or greater than 10 times the size of the third colored particles 32C, and it is desirable for the size of the first colored particles 32A and the second colored particles 32B to be equal to or greater than 20 times the size of the third colored particles 32C in a case where variations in the particle diameter of each of the colored particle groups is large. In this case, the third colored particles 32C can excellently move, without becoming stuck, through the clearances between the first colored particles 32A and the second colored particles 32B.

Further, although higher resolution image display can be achieved the smaller the size of the third colored particles 32C is, it is desirable for the size of the third colored particles 32C to be equal to or greater than 20 nm and equal to or less than 10 μm because moving velocity drops and display switching velocity drops and because it becomes difficult to achieve a balance between memorability of the display and stability of the dispersion.

Further, the first colored particles 32A and the second colored particles 32B may be given filling amounts of about one layer each between the display substrate 18 and the back substrate 28. However, higher coverage is obtained when the first colored particles 32A and the second colored particles 32B are given filling amounts where plural layers are capable of being disposed, which is preferable. In this case, when the size of the first colored particles 32A and the second colored particles 32B becomes larger, the distance between the substrates becomes larger, and an increase in the display driving voltage and a drop in the display switching velocity occur, so it is preferable for the size of the first colored particles 32A and the second colored particles 32B to be equal to or less than 50 μm and more preferable for the size of the first colored particles 32A and the second colored particles 32B to be equal to or less than 30 μm.

Further, the first colored particles 32A and the second colored particles 32B of the present exemplary embodiment are configured such that they are moved toward respectively different substrates when an electric field is imparted by applying a voltage of a predetermined specific level between the substrates for a predetermined specific amount of time; in the present exemplary embodiment, a case will be described where the first colored particles 32A are negatively charged and where the second colored particles 32B are positively charged, but positive and negative may also be reversed. Further, even when just one group of colored particles is charged, the other group of colored particles can be moved toward the substrate on the opposite side by the movement of the colored particles that are charged, so just one group of colored particles may be positively or negatively charged.

The volume filling rate of the first colored particles 32A and the second colored particles 32B is configured to be about 10% to 60%, and preferably about 30% to 50%, when 100% represents the space inside the cell in order to ensure movement between the substrates and display density. Additionally, in the case of a state where the first colored particles 32A and the second colored particles 32B have aggregated together (a state where an electric field has been applied between the substrates and the colored particles have moved in the directions of each substrate and gathered together), the third colored particles 32A are, as mentioned previously, configured to be capable of passing between the first colored particles 32A and the second colored particles 32B.

Further, the colored particles 32 are colored respectively different colors. In the present exemplary embodiment, tile first colored particles 32A are colored a white color, the second colored particles 32B are colored a black color, and the third colored particles 32C are colored a red color.

The surface electrode 16 and the back electrode 22 are connected to the voltage applicator 40, and a voltage is applied to the surface electrode 16 and the back electrode 22 by the voltage applicator 40, whereby an electric field is formed between the substrates.

The voltage applicator 40 is connected to the controller 42, and the image memory 44 is connected to the controller 42. The controller 42 is configured to include a CPU, a ROM, a RAM and a hard disk, and the CPU performs image display on the image display medium 12 in accordance with a program that is stored in the ROM or the hard disk. A hard disk or the like can be applied as the image memory 44, and the image memory 44 stores display images for displaying images on the image display medium 12. That is, the controller 42 controls the voltage applicator 40 to apply a voltage between the substrates in response to a display image stored in the image memory 44, whereby the colored particles 32 move in response to the voltage and an image is displayed. It will be noted that the display image that is stored in the image memory 44 may also be downloaded to the image memory 44 via a recording medium such as a CD-ROM or DVD or a network.

Further, as for the colored particles 32, the state when the voltage is applied is maintained by adhesive force such as the van der Waals force or image force even after application of the voltage between the substrates has stopped.

Figure 2:
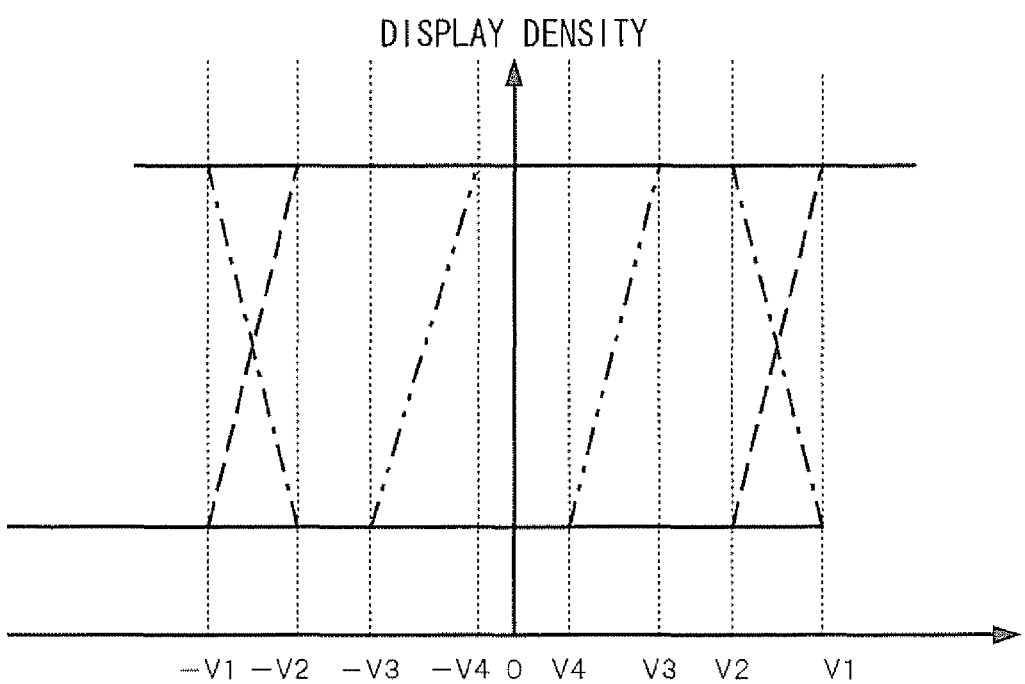
FIG. 2 is a diagram for describing applied voltages that are necessary in order to cause colored particles to move in the image display device pertaining to the first exemplary embodiment of the present invention.

FIG. 2 is a diagram for describing applied voltages that are necessary in order to cause the colored particles 32 to move in the image display device pertaining to the first exemplary embodiment of the present invention.

In the present exemplary embodiment, the charging characteristics of the colored particles 32 are different, and the range of voltages that are necessary in order to cause the colored particles to move toward a desired substrate and display the colors of the colored particles 32 is as shown in FIG. 2. FIG. 2 shows display density characteristics resulting from the colored particles 32 when the back electrode 22 is grounded (0 V) and a desired pulse voltage is applied to the surface electrode 16. As for the display density, a pulse voltage was applied between the display surface side and the back surface side, this pulse voltage was gradually chanced in an incremental manner (the applied voltage was increased or reduced), and the optical density (OD) on the display surface side at each pulse voltage was measured by a reflection densitometer (X-Rite 404) made by X-Rite. It will be noted that, in regard to white color, the density dropped when the colored particles moved toward the display substrate, but FIG. 2 shows a case where white color particles are moving toward the display substrate as being, one where the density is high.

In the present exemplary embodiment, because of a difference in the charging amount and particle diameter (volume average particle diameter) between the colored particles 32, a difference is set between the adhesive force between the colored particles 32 and the surface layer 17 of the display substrate 18 and the adhesive force between the colored particles 32, and a difference is set between the moving starting voltage of the first colored particles 32A and the second colored particles 32B, and the moving starting voltage of the third colored particles 32C.

It will be noted that the display density characteristics of the colored particles 32 may be controlled by the aforementioned difference in adhesive force or may be controlled by the difference in the mobility of the colored particles 32 as a separate manner However, because at least the white color particles of the first colored particles 32A and the second colored particles 32B are not transparent, the third colored particles 32C do not contribute to the display density unless they move further toward the display substrate than the white color particles. When the mobility of the third colored particles 32C is small, the third colored particles 32C only move a little in pulse voltage application of a low voltage, so the third colored particles 32C do not contribute at all to the display density. Further, the third colored particles 32C move more toward the display substrate than the white color particles when a certain voltage is exceeded, come to contribute to the display density. Therefore, the third colored particles 32C become the display characteristic shown in FIG. 2. Further, the first colored particles 32A and the second colored particles 32B are similar, do not contribute to the display density until the black color particles move more toward the display substrate than the white color particles, and become the display characteristic shown in FIG. 2.

In the present exemplary embodiment, the first colored particles 32A are negatively charged, the second colored particles 32B are positively charged, and the third colored particles 32C are negatively charged; the voltage range that is necessary in order to cause the first colored particles 32A and the second colored particles 32B to move and display the colors of the colored particles is set to $|V2 \leqq V \leqq V1|$ (absolute value of a value between V2 and V1), and the voltage range that is necessary in order to cause the third colored particles 32C to move and display the color of the third colored particles is set to $|V4 \leqq V \leqq V3|$ (absolute value of a value between V4 and V3). Here, $|V4|$ may be equal to 0 V, but it is preferable for $|V|$ to be greater than 0 V in consideration of the memorability of display.

Next, an example of drive control of the image display device 10 pertaining to the first exemplary embodiment of the present invention configured as described above will be described. It will be noted that, below, in order to facilitate description, an example will be described where the back substrate 28 is grounded (0 V) and where a voltage is applied to the surface electrode 16.

First, when the voltage applicator 40 applies an applied voltage V (V1) between the surface electrode 16 and the back electrode 22 by the control of the controller 42, the negatively charged first colored particles 32A move toward the display substrate 18 and the positively charged second colored particles 32B move toward the back substrate 28. Further, the negatively charged third colored particles 32C pass through the clearances between the first colored particles 32A and the second colored particles 32B and move toward the display substrate 18, the state shown in FIG. 3(1) is reached, and the red color of the third colored particles 32C is displayed.

Figure 3:
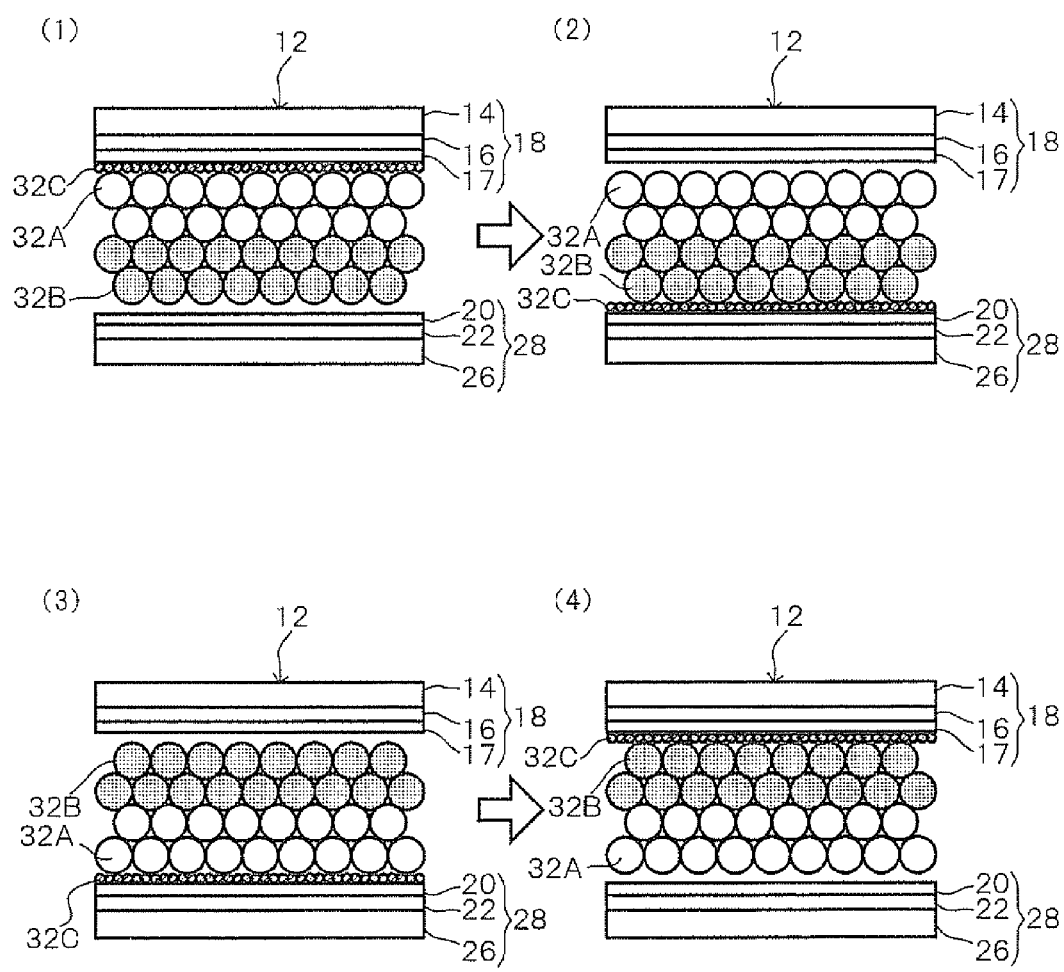
FIG. 3 is a diagram for describing drive control of the image display device pertaining to the first exemplary embodiment of the present invention and is a state transition diagram to each color display.

Further, from the state shown in FIG. 3(1), the voltage applicator 40 applies an applied voltage V (−V3) between the surface electrode 16 and the back electrode 22 by the control of the controller 42, whereby just the third colored particles 32C move toward the back substrate 28, the state shown in FIG. 3(2) is reached, and the white color of the first colored particles 32A is displayed.

On the other hand, when the voltage applicator 40 applies an applied voltage V (−V1) between the surface electrode 16 and the back electrode 22 by the control of the controller 42, the negatively charged first colored particles 32A move toward the back substrate 28 and the positively charged second colored particles 32B move toward the display substrate 18. Further, the negatively charged third colored particles 32C pass through the clearances between the first colored particles 32A and the second colored particles 32B and move toward the back substrate 28, the state shown in FIG. 3(3) is reached, and the black color of the second colored particles 32B is displayed.

That is, in the present exemplary embodiment, the particle diameters of two types of colored particles that are the first colored particles 32A and the second colored particles 32B of three types of colored particles are larger than the particle diameter of the other one type that is the colored particles 32C, the clearances between the first colored particles 32A and the second colored particles 32B are reduced to be equal to or less than an extent where the other one type of the colored particles 32C are capable of moving through those clearances, and the voltage ranges for causing the colored particles to move are made different. Thus, even when the third colored particles 32C that contact or come close to the first colored particles 32A and the second colored particles 32B are driven, it is difficult for the first colored particles 32A and the second colored particles 32B to be affected by the movement of the third colored particles 32C because of the weight differences. Further, by ensuring that the first colored particles 32A and the second colored particles 32B have a volume filling fraction to a certain extent (in the present exemplary embodiment, about 30% to 60%), it is difficult for the first colored particles 32A and the second colored particles 32B to move because of friction between the first colored particles 32A and the second colored particles 32B. Therefore, the first colored particles 32A and the second colored particles 32B are not affected by the movement of the third colored particles 32C Consequently, by first driving the first colored particles 32A and the second colored particles 32B that are difficult to move, or in other words whose voltage range for causing the colored particles to move is large, and then causing the third colored particles 32C to move, color display where color mixing is controlled is performed.

Further as for the first colored particles 32A and the second colored particles 32B, as long as one is charged, the desired one can be moved toward the display substrate 18, but in the present exemplary embodiment, they are charged to opposite polarities, so the desired one is more reliably moved toward the display substrate 18.

It will be noted that, in the present exemplary embodiment, an example has been applied where the first colored particles 32A were colored white, the second colored particles 32B were colored black and the third colored particles 32C were colored red, but the invention is not limited to this, and an example where the colored particles are colored other colors may also be applied. For example, an example where the first colored particles 32A are colored white, the second colored particles 32B are colored cyan and the third colored particles are colored red may also be applied. In this case, red color display is performed in FIG. 3(1), white color display is performed in FIG. 3(2), and cyan color display is performed in FIG. 3(3); moreover, from the state shown in FIG. 3(3), when the voltage applicator 40 applies an applied voltage V (+V3) between the surface electrode 16 and the back electrode 22 by the control of the controller 42, just the third colored particles 32C move toward the display substrate 18, the state shown in FIG. 3(4) is reached, and the second colored particles 32B and the third colored particles 32C are in a complimentary color relationship, so black color is displayed, and it becomes possible to display the four colors of white color, black color, red color and cyan color. Further, in this case, in order to cause black color to be displayed by the red color of the third colored particles 32C and the cyan color of the second colored particles 32B, it is preferable to apply third colored particles 32C that are translucent to the extent that they can display a secondary color.

It will be noted that, in the present exemplary embodiment, an example has been described in which the voltage range that causes the first colored particles 32A and the second colored particles 32B to move and perform display is larger than the voltage range that causes the third colored particles 32C to move and perform display, but conversely to this, the voltage range that causes the third colored particles 32C to move and perform display may also be made larger than the voltage range that causes the first colored particles 32A and the second colored particles 32B to move and perform display. However, in this case, there are times when the third colored particles 32C that have previously moved toward the desired substrate end up being disturbed by the movement of the first colored particles 32A and the second colored particles 32B whose particle diameters are large and, accordingly, it is more preferable for the voltage range that causes the first colored particles 32A and the second colored particles 32B to move and perform display to be larger than the voltage range that causes the third colored particles 32C to move and perform display.

Second Exemplary Embodiment

Figure 4:
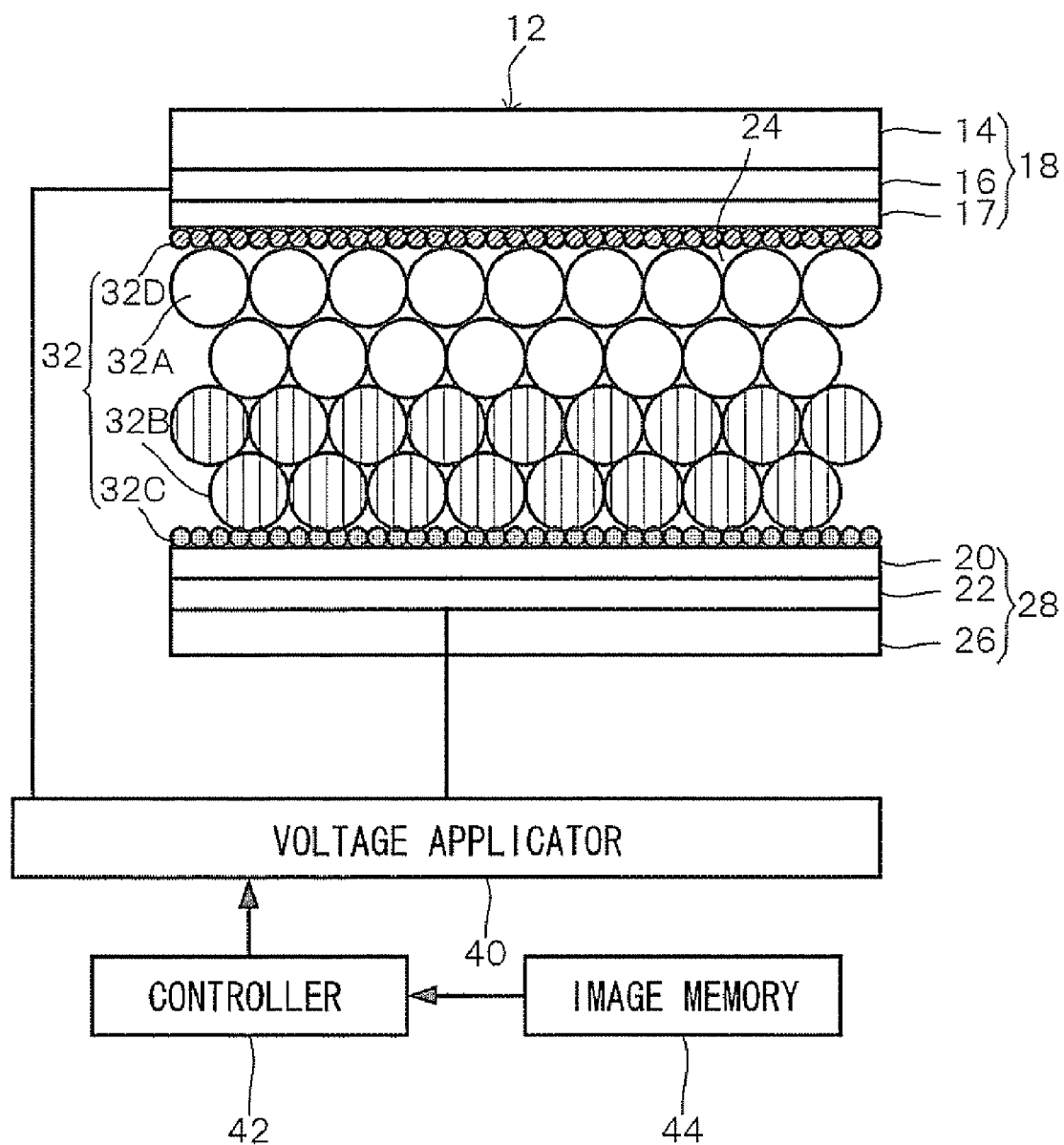
FIG. 4 is a diagram showing the configuration of an image display device pertaining to a second exemplary embodiment of the present invention.

Next, an image display device pertaining to a second exemplary embodiment of the present invention will be described. FIG. 4 is a diagram showing the configuration of the image display device pertaining to the second exemplary embodiment of the present invention. It will be noted that, in FIG. 4, configurations that are the same as those in the first exemplary embodiment are indicated by the same reference numerals.

In the first exemplary embodiment, of three types of colored particles, the particle diameters of the two types of colored particles of the first colored particles 32A and the second colored particles 32B are larger than the particle diameter of the other one type of the colored particles 32C, the clearances between the first colored particles 32A and the second colored particles 32B are reduced to be equal to or less than an extent where the other one type of the colored particles 32C are capable of moving through those clearances, and the voltage ranges for causing the colored particles to move are made different. However, in the second exemplary embodiment, the image display device is further disposed with fourth colored particles 32D whose particle diameter is smaller than the particle diameters of the first colored particles 32A and the second colored particles 32B. Below, differences with respect to the first exemplary embodiment will be described.

In the present exemplary embodiment, the first colored particles 32A are colored white, the second colored particles 32B are colored yellow, the third colored particles 32C are colored cyan and the fourth colored particles 32D are colored magenta, but the colored particles are not limited to this and may also be colored other colors.

For the fourth colored particles 32D that are further disposed with respect to the first exemplary embodiment, colored particles whose particle diameter is smaller than the particle diameters of the first colored particles 32A and the second colored particles 32B are applied and, similar to the third colored particles 32C, the fourth colored particles 32D are given a particle diameter of an extent where the fourth colored particles 32D can pass through the clearances between the first colored particles 32A and the second colored particles 32B; the fourth colored particles 32D may have the same particle diameter as the third colored particles 32C or may have a different particle diameter. Further, for the third colored particles 32C and the fourth colored particles 32D, colored particles that are translucent to an extent where they can display secondary colors are applied.

Figure 5:
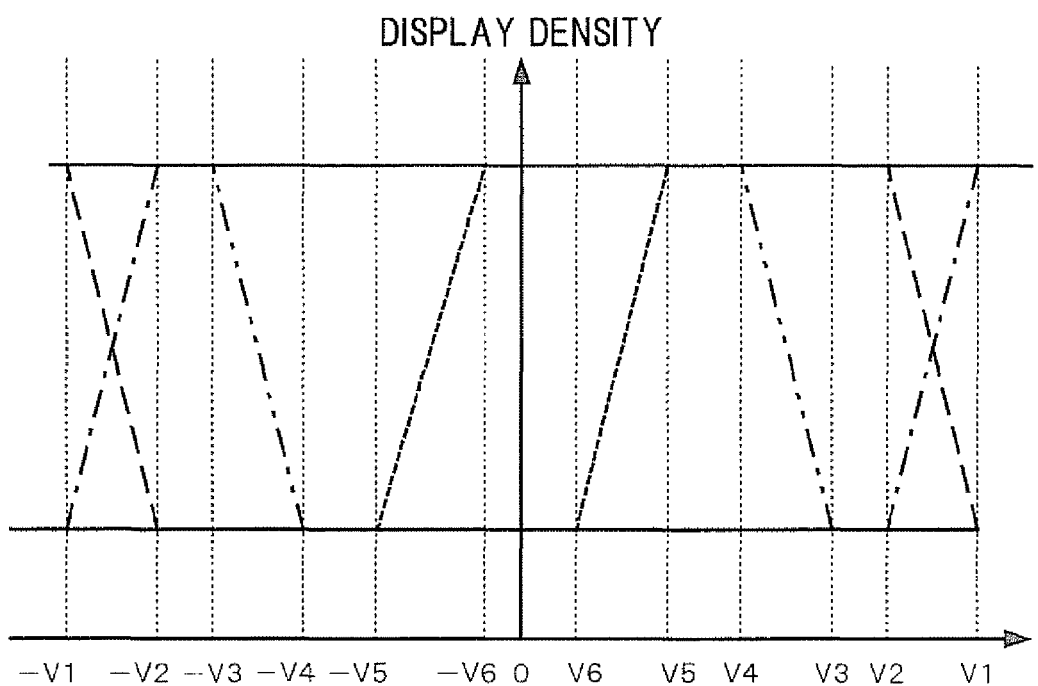
FIG. 5 is a diagram for describing applied voltages that are necessary in order to cause first to fourth colored particles to move in the image display device pertaining to the second exemplary embodiment of the present invention.

FIG. 5 is a diagram for describing applied voltages that are necessary in order to cause the first to fourth colored particles 32A to 32D to move in the image display device pertaining to the second exemplary embodiment of the present invention.

In the present exemplary embodiment also, the charging characteristics of the first to fourth colored particles 32A to 32D are different. Further, the voltage ranges that are necessary in order to cause the colored particles to move are as shown in FIG. 5.

In the present exemplary embodiment, the first colored particles 32A are positively charged, the second colored particles 32B are negatively charged, the third colored particles 32C are positively charged and the fourth colored particles 32D are negatively charged.

Further, the voltage range that is necessary in order to cause the first colored particles 32A and the second colored particles 32B to move is set to $|V2 \leq V \leq V1|$ (absolute value of a value between V2 and V1), the voltage range that is necessary in order to cause the third colored particles 32C to move is set to $|V4 \leq V \leq V3|$ (absolute value of a value between V4 and V3), and the voltage range that is necessary in order to cause the fourth colored particles 32D to move is set to $|V6 \leq V \leq V5|$ (absolute value of a value between V6 and V5).

It will be noted that the charging polarities are not limited to this and that it suffices for the first colored particles 32A and the second colored particles 32B to move in respectively opposite directions. Further, in the present exemplary embodiment, a case will be described where the third colored particles 32C and the fourth colored particles 32D are charged to opposite polarities, but the third colored particles 32C and the fourth colored particles 32D may also be of the same polarity because they can move independently as long as the ranges of the voltages that are necessary in order to cause the colored particles to move are different.

Next, an example of drive control of the image display device pertaining to the second exemplary embodiment of the present invention configured as described above will be described. It will be noted that, below, in order to facilitate description, an example will be described where the back substrate 28 is grounded (0 V) and where a voltage is applied to the surface electrode 16.

First, when the voltage applicator 40 applies an applied voltage V (−V1) between the surface electrode 16 and the back electrode 22 by the control of the controller 42, the first colored particles 32A move toward the display substrate 18 and the second colored particles 32B move toward the back substrate 28. Further, the third colored particles 32C pass through the clearances between the first colored particles 32A and the second colored particles 32B and move toward the display substrate 18, and the fourth colored particles 32D move toward the back substrate 28. Thus, the state shown in FIG. 6(1) is reached, and the third colored particles 32C that are colored cyan are viewed from the display substrate 18 side. At this time, cyan color is displayed because the first colored particles 32A that are colored white are on the underside (back substrate 28 side) of the third colored particles 32C that are translucent.

Figure 6:
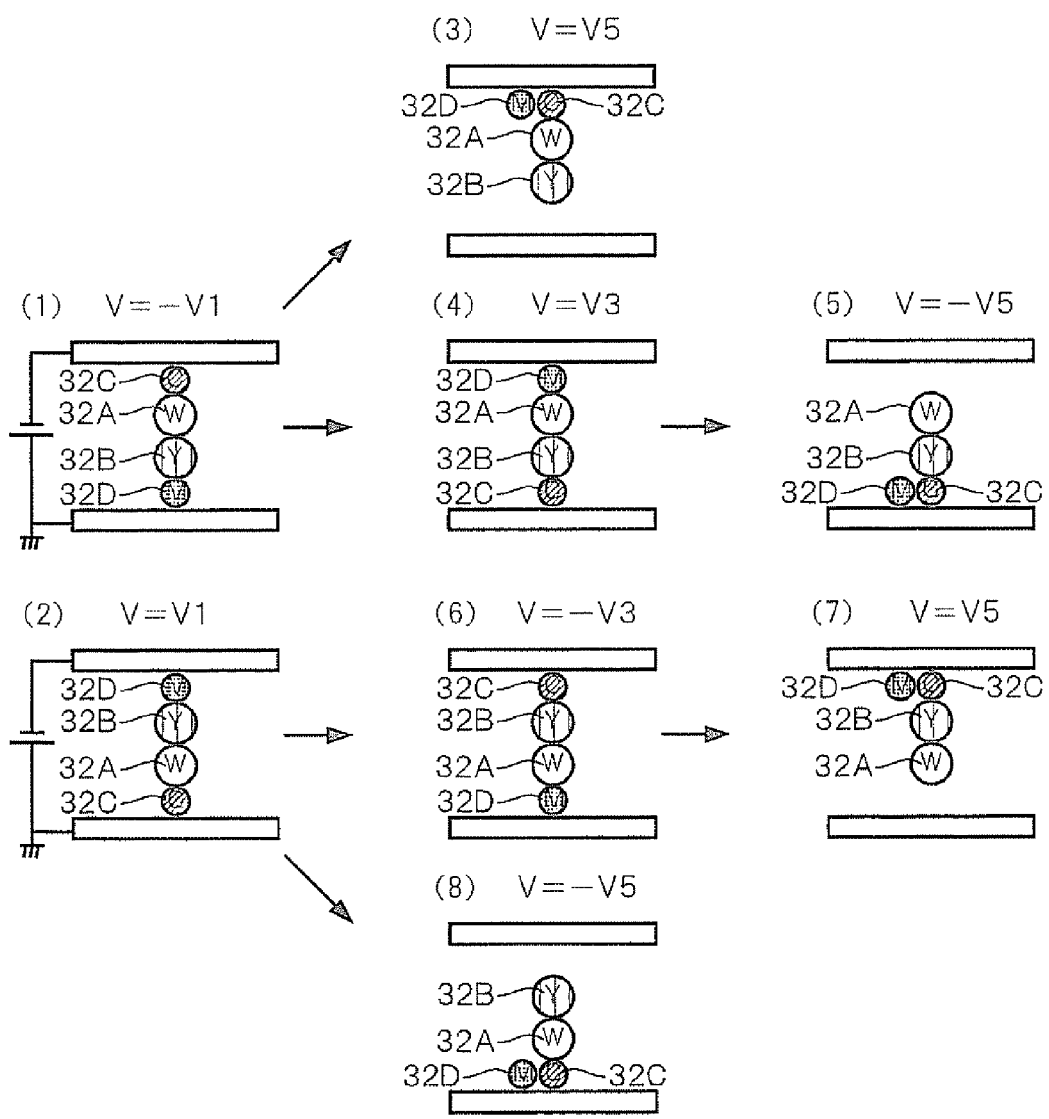
FIG. 6 is a diagram for describing drive control of the image display device pertaining to the second exemplary embodiment of the present invention and is a state transition diagram to each color display.

Further, from the state shown in FIG. 6(1) (cyan color display state), when the voltage applicator 40 applies an applied voltage V (V5) between the surface electrode 16 and the back electrode 22 by the control of the controller 42, the fourth colored particles 32D move toward the display substrate 18. Thus, the state shown in FIG. 6(3) is reached, and the third colored particles 32C that are colored cyan and the fourth colored particles 32D that are colored magenta are viewed from the display substrate 18 side. At this time, blue color, which is a subtractive color mixture of cyan color and magenta color, is displayed because the first colored particles 32A that are colored white are on the underside (back substrate 28 side) of the third colored particles 32C and the fourth colored particles 32D that are translucent.

Further, from the state shown in FIG. 6(1) (cyan color display state), when the voltage applicator 40 applies an applied voltage V (V3) between the surface electrode 16 and the back electrode 22 by the control of the controller 42, the third colored particles 32C move toward the back substrate 28 and the fourth colored particles 32D move toward the display substrate 18. Thus, the state shown in FIG. 6 (4) is reached, and the fourth colored particles 32D that are colored magenta are viewed from the display substrate 18 side. At this time, magenta color is displayed because the first colored particles 32A that are colored white are on the underside (back substrate 28 side) of the fourth colored particles 32D that are translucent.

Further, from the state shown in FIG. 6(4) (magenta color display state), when the voltage applicator 40 applies an applied voltage V (−V5) between the surface electrode 16 and the back electrode 22 by the control of the controller 42, the fourth colored particles 32D move toward the back substrate 28. Thus, the state shown in FIG. 6(5) is reached, the first colored particles 32A that are colored white are viewed from the display substrate 18 side, and white color is displayed.

On the other hand, when the voltage applicator 40 applies an applied voltage V (V1) between the surface electrode 16 and the back electrode 22 by the control of the controller 42, the first colored particles 32A move toward the back substrate 28 and the second colored particles 32B move toward the display substrate 18. Further, passing through the clearances between the first colored particles 32A and the second colored particles 32B, the third colored particles 32C move toward the back substrate 28 and the fourth colored particles 32D move toward the display substrate 18. Thus, the state shown in FIG. 6(2) is reached and the fourth colored particles 32D that are colored magenta are viewed from the display substrate 18 side, but red color, which is a subtractive color mixture of magenta color and yellow color, is displayed because the second colored particles 32B that are colored yellow are on the underside (back substrate 28 side) of the fourth colored particles 32D that are translucent.

Further, from the state shown in FIG. 6(2) (red color display state), when the voltage applicator 40 applies an applied voltage V (−V3) between the surface electrode 16 and the back electrode 22 by the control of the controller 42, the third colored particles 32C move toward the display substrate 18 and the fourth colored particles 32D move toward the back substrate 28. Thus, the state shown in FIG. 6(6) is reached and the third colored particles 32C that are colored cyan are viewed from the display substrate 18 side. At this time, green color, which is a subtractive color mixture of cyan color and yellow color, is displayed because the second colored particles 32B that are colored yellow are on the underside (back substrate 28 side) of the third colored particles 32C that are translucent.

Further, from the state shown in FIG. 6(6) (green color display state), when the voltage applicator 40 applies an applied voltage V (V5) between the surface electrode 16 and the back electrode 22 by the control of the controller 42, the fourth colored particles 32D move toward the display substrate 18. Thus, the state shown in FIG. 6(7) is reached and the third colored particles 32C that are colored cyan and the fourth colored particles 32D that are colored magenta are viewed from the display substrate 18 side. At this time, black color, which is a subtractive color mixture of cyan color, magenta color and yellow color, is displayed because the second colored particles 32B that are colored yellow are on the underside (back substrate 28 side) of the third colored particles 32C and the fourth colored particles 32D that are translucent.

Further, from the state shown in FIG. 6(2) (red color display state), when the voltage applicator 40 applies an applied voltage V (−V5) between the surface electrode 16 and the back electrode 22 by the control of the controller 42, the fourth colored particles 32D move toward the back substrate 28. Thus, the state shown in FIG. 6(8) is reached, the second colored particles 32B that are colored yellow are viewed from the display substrate 18, and yellow color is displayed.

In this manner, even when the image display device further includes the fourth colored particles 32D with respect to the first exemplary embodiment, even when the third colored particles 32C and the fourth colored particles 32D that contact or come close to the first colored particles 32A and the second colored particles 32B are driven, it is difficult for the first colored particles 32A and the second colored particles 32B to be affected by the movement of the third colored particles 32C and the fourth colored particles 32D because of the weight differences. Further, by ensuring that the first colored particles 32A and the second colored particles 32B have a volume filling fraction to a certain extent (in the present exemplary embodiment, about 30% to 60%), it is difficult for the first colored particles 32A and the second colored particles 32B to move because of friction between the first colored particles 32A and the second colored particles 32B. Therefore, the first colored particles 32A and the second colored particles 32B are not affected by the movement of the third colored particles 32C and the fourth colored particles 32D.

Consequently, by first driving the first colored particles 32A and the second colored particles 32B that are difficult to move, or in other words whose voltage range for causing the colored particles to move is large, and then causing the third colored particles 32C or the fourth colored particles 32D to move, color mixing is prevented in color display.

Further, in the present exemplary embodiment, the colored particles are colored white, yellow color, cyan color and magenta color, whereby 8-color display becomes possible.

Further, as for the first colored particles 32A and the second colored particles 32B, as long as one is charged, the desired one can be moved toward the display substrate 18, but in the present exemplary embodiment, they are charged to opposite polarities, so the desired one is more reliably moved toward the display substrate 18.

Further, as for the third colored particles 32C and the fourth colored particles 32D, as long as the voltage ranges that are necessary in order to cause the colored particles to move are respectively different, they can be independently moved, but in the present exemplary embodiment, they are charged to opposite polarities, so movement of colored particles where color mixing is controlled even more than in the case of the same polarity becomes possible.

It will be noted that the particle diameters of the first colored particles 32A and the second colored particles 32B in each of the preceding exemplary embodiments may be the same or different.

Further, in each of the preceding exemplary embodiments, the volume filling fractions of the first colored particles 32A and the second colored particles 32B were about 30% to about 60%, but it is not necessary for the first colored particles 32A and the second colored particles 32B to be the same volume filling, fractions; for example, it is possible to improve the whiteness degree during white color display by ensuring that the volume filling fraction of the first colored particles 32A that are colored white becomes larger than the volume filling fraction of the second colored particles 32B.

Further, in each of the preceding exemplary embodiments, gradation display was not particularly describe, but gradation realization of each color is also possible by adjusting the amount of time when applying a voltage or the voltage level.

Further, in each of the preceding exemplary embodiments, the color of the dispersion liquid 24 was not particularly described, but a colored dispersion liquid may also be applied.

Further, in the second exemplary embodiment, a case has been described where the first colored particles 32A and the second colored particles 32B were charged to opposite polarities, but the invention is not limited to this; as described in the first exemplary embodiment, even when just one colored particle group is charged, the other colored particle group moves in the opposite direction (toward the substrate on the opposite side) relatively with respect to the one colored particle group by the movement of the colored particle group that is charged. Therefore, just one of the colored particle groups may be positively or negatively charged.

Third Exemplary Embodiment

Figure 7:
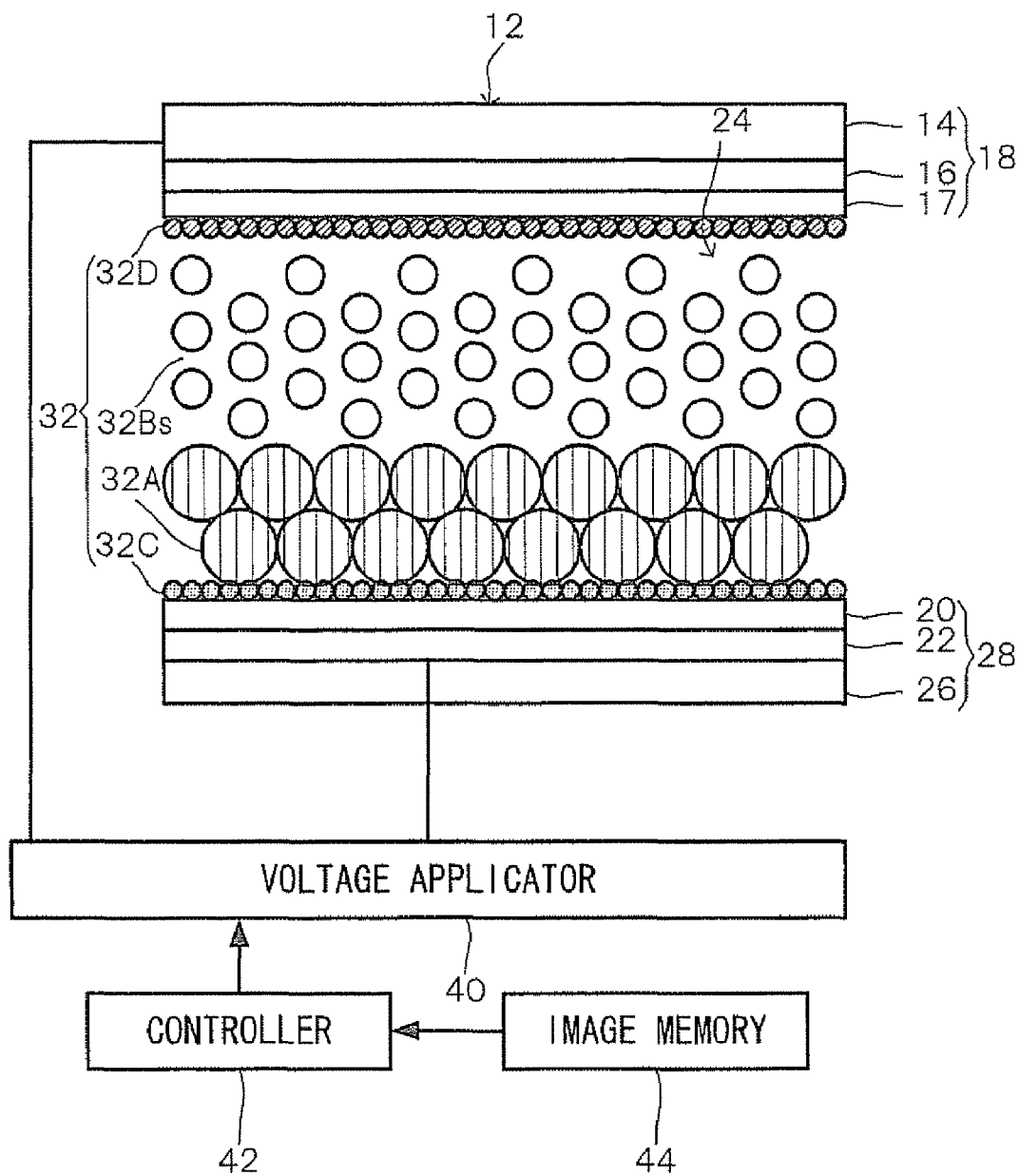
FIG. 7 is a diagram showing the configuration of an image display device pertaining to a third exemplary embodiment of the present invention.

Next, an image display device pertaining to a third exemplary embodiment of the present invention will be described FIG. 7 is a diagram showing the configuration of the image display device pertaining to the third exemplary embodiment of the present invention. It will be noted that, in regard to configurations that are the same as those in the second exemplary embodiment, the same reference numerals will be given and described.

In the first exemplary embodiment, there has been described an example where, of three types of colored particles, the particle diameters of the two types of colored particles of the first colored particles 32A and the second colored particles 32B are larger than the particle diameter of the other one type of the colored particles 32C, the clearances between the first colored particles 32A and the second colored particles 32B are reduced to be equal to or less than an extent where the other one type of the colored particles 32C are capable of moving through those clearances, and the voltage ranges for causing the colored particles to move are made different. Further, in the second exemplary embodiment, there has been described an example where, with respect to the first exemplary embodiment, the image display device is further disposed with the fourth colored particles 32D whose particle diameter is smaller than the particle diameters of the first colored particles 32A and the second colored particles 32B. However, in the third exemplary embodiment, a case will be described where there are applied second colored particles 32Bs in the second exemplary embodiment that do not have a charging characteristic and float in the dispersion fluid 24.

In the present exemplary embodiment, the first colored particles 32A are colored yellow, the second colored particles 32Bs are colored white, the third colored particles 32C are colored cyan and the fourth colored particles 32D are colored magenta, but the colored particles are not limited to this and may also be colored other colors.

In the present exemplary embodiment, the second colored particles 32Bs do not have a charging characteristic and float between the substrates. That is, when the first colored particles 32A move, the second colored particles 32Bs move in the opposite direction relatively with respect to the first colored particles 32A.

Further, in the present exemplary embodiment, the particle diameter of the second colored particles 32Bs is configured to be smaller than the particle diameter of the first colored particles 32A and larger than the particle diameters of the third colored particles 32C and the fourth colored particles 32D. Further, the particle diameters of the first colored particles 32A, the third colored particles 32C and the fourth colored particles 32D are set to particle diameters such that the third colored particles 32C and the fourth colored particles 32D move through the clearances between the first colored particles 32A and the second colored particles 32Bs in a state where the first colored particles 32A have aggregated together by an electric field that has formed between the substrates. As described also in the first exemplary embodiment, it is desirable for the particle diameter of the first colored particles 32A to be equal to or greater than 10 times (preferably equal to or greater than 20 times) the particle diameters of the third colored particles 32C and the fourth colored particles 32D.

Further, it is preferable for the particle diameters of the third colored particles 32C and the fourth colored particles 32D to be equal to or less than Φ600 nm, and the third colored particles 32C and the fourth colored particles 32D obtain transparency (translucency).

Further, it is desirable for the particle diameter of the second colored particles 32Bs to be larger than the particle diameters of the third colored particles 32C and the fourth colored particles 32D in consideration of the ease and stability of turnover with other colored particles, but the particle diameter of the second colored particles 32Bs may be about the same as or smaller than the particle diameters of the third colored particles 32C and the fourth colored particles 32D. However, in consideration of settling and reflectivity, it is preferable for the particle diameter of the second colored particles 32Bs to be equal to or greater than 100 nm and equal to or less than 3 μm.

Here, an example of a method of preparing each of the colored particles that are used in the image display device pertaining to the third exemplary embodiment of the present invention will be described. In regard to the method of manufacturing each of the colored particles, the various types of methods that have been described in the first exemplary embodiment can be applied, but below, an example of a method of manufacturing the colored particles that are used in the image display device pertaining to the third exemplary embodiment will be described.

First, a method of preparing the first colored particles 32A will be described.

53 parts per weight of methyl methacrylate, 0.3 parts per weight of 2-(diethylamine)ethyl methacrylate and 1.5 parts per weight of a yellow color pigment (FY7416: made by Sanyo Color Works, Ltd.) were mixed together, ball milling was implemented for 20 hours in a 10 mm Φ zirconia ball, and a dispersion liquid BA was prepared.

Further, 40 parts per weight of calcium carbonate and 60 parts per weight of water were mixed together and, in the same manner as in the preparation of the dispersion liquid BA, these were finely milled in a ball mill, and a calcium carbonate dispersion liquid BB was prepared.

Further, 60 g of the calcium carbonate dispersion liquid BB and 4 g of 20% salt water were mixed together, deaeration was performed for 10 minutes by an ultrasonic machine, next, the mixture was stirred by an emulsification machine, and a mixed liquid BC was prepared.

Then, 20 g of the dispersion liquid BA, 0.6 g of ethylene glycol dimethacrylate and 0.2 g of a polymerization initiator V-601 (made by Wako Pure Chemical Industries, Ltd) were measured, sufficiently mixed together, and deaeration was performed for 10 minutes by an ultrasonic machine. This was added to the mixed liquid BC, and emulsification was implemented by an emulsification machine. Next, this emulsified liquid was put into a flask, the flask was plugged with a silicone plug, an injection needle was used to sufficiently perform depressurization and deaeration, and nitrogen gas was enclosed. Next, it was reacted for 15 hours at 65° C. and particles were prepared. After cooling, the particles were filtered out, the obtained microparticle powder was dispersed in ion-exchange water, the calcium carbonate was dissolved by hydrochloric acid, and filtration was performed. Thereafter, the particles were cleaned with sufficient distilled water, placed in a nylon sieve with openings of 15 μm, 10 μm, and the particle size was sorted. Thus, particles with an average particle diameter of 13 μm were obtained. (In the case of 5 μm particles, Y particles passed through a 5 μm mesh are left at rest for 1 day and night and the micropowder on top is filtered by a 1 μm filter, whereby Y particles with a particle diameter of 5 μm can be obtained.)

The obtained particles were dispersed in viscosity 1 cSt silicone oil (KF-96L-1CS: made by Shin-Etsu Chemical Co., Ltd.), dodecyl bromide was added in an equimolar amount as 2-(diethylamino) ethyl methacrylate and heated for 6 hours at 90° C. After cooling, this dispersion liquid was cleaned by a large quantity of silicone oil, depressurized and dried, whereby yellow particles were obtained. These were the first particles 32A.

Next, the method of preparing the second colored particles 32Bs will be described.

5 g of 2-vinyl naphthalene (made by Nippon Steel Chemical Co., Ltd.), 5 g of silicone macromer FM-0721 (made by Chisso Corporation), 0.26 g of lauroyl peroxide (made by Wako Pure Chemical Industries, Ltd.) as an initiator, and 20 ml of silicone oil (KF-96L-1CS: made by Shin-Etsu Chemical Co., Ltd.) were added to a 100 ml three-necked flask to which a reflux cooling tube was attached, bubbling by nitrogen gas was performed for 15 minutes, and thereafter polymerization at 65° C. and for 24 hours was performed under a nitrogen atmosphere.

The obtained white color particles were prepared in a solid content concentration (40) wt % by silicone oil to make the second colored particles 32Bs (floating white color particles). At this time, the particle diameter of the second colored particles 32Bs was 650 nm.

It will be noted that, in addition, as for something where a resin or whiskers are coated on a pigment, what is described in Example 2 in JP-A No. 2008-122468, for example, can be used.

Next, the method of preparing the third colored particles 32C will be described.

95 parts per weight of Silaplane FM-0711 (made by Chisso Corporation) that is a silicone monomer, 3 parts per weight of methyl methacrylate, and 2 parts per weight of glycidyl methacrylate were mixed together with 50 parts per weight by silicone oil, 0.5 parts per weight of azobisvaleronitrile was added as a polymerization initiator, polymerization was implemented, and a reactive silicone polymer B (reactive dispersant) having an epoxy group was manufactured The weight-average molecular weight was 600,000. Additionally, a 3 weight % silicone oil solvent of the reactive silicone polymer B was prepared. It will be noted that, as the silicone oil, dimethyl silicone oil (made by Shin-Etsu Chemical Co., Ltd.: KF-96L-2CS) was used.

Next, as a polymer having a charging group, a copolymer (weight-average molecular weight of 600,000) where the ratio by weight between N-vinyl pyrrolidone and N,N-diethylaminoacrylate is 9/1 was synthesized by ordinary radical solution polymerization and used.

Next, this suspension was depressurized (2 KPa) and heated (70° C.) to remove moisture, and a silicone oil dispersion liquid in which was dispersed colored particles including the pigment and the polymer having the charging group in silicone oil was obtained. Moreover, this dispersion liquid was heated for 3 hours at 100° C. and reacted and bonded with the reactive silicone polymer. Next, butyl bromide corresponding to 50% of the molecular weight of the N,N-diethylaminoethylacrylate in the particle solid component was added to the dispersion liquid, heated for 3 hours at 80° C., amino group quaternization was performed, a centrifugal separation device was used to settle out the particles, cleaning with silicone oil and settling were repeated, and refinement was performed. In this manner, a display-use particle dispersion liquid whose particle solid component is 5% by weight was manufactured. As a result of measuring the bonding amount of the reactive silicone polymer by element analysis, it was 20% by weight with respect to the particle weight. As a result of measuring (manufactured by Horiba LA-300: laser light scattering/diffracting particle size measuring device) the volume average particle diameter of the manufactured particle dispersion liquid, it was 380 nm.

As for the charging characteristic of the electrophoretic particles in the dispersion system, as a result of enclosing the dispersion system between two electrode substrates, applying a direct current and evaluating the migrating direction, it was positive charging.

Next, the method of preparing the fourth colored particles 32D will be described.

53 parts per weight of cyclohexyl methacrylate, 3 parts per weight of a magenta pigment (carmine 6B: made by Dainichi Seika), 2 parts per weight of a charge control agent (Copy Charge NY VP2351: made by Clariant Japan), and 5 parts per weight of cyclohexane were mixed together, ball milling was implemented for 20 hours in a Φ10 mm zirconia ball, and a dispersion liquid A was prepared.

Further, 40 parts per weight of calcium carbonate and 60 parts per weight of water were mixed together and, in the same manner as the dispersion liquid A, were finely milled by a ball mill such that a calcium carbonate dispersion liquid B was prepared.

Further, 4.3 g of 2% serogen aqueous solution (made by Dai-Ichi Kogyo Seiyaku Co., Ltd.), 8.5 g of the calcium carbonate dispersion liquid B and 50 g of 20% saline solution were mixed together, deaeration was performed for 10 minutes by an ultrasonic machine, next the mixture was stirred by an emulsification machine, and a mixed liquid C was prepared.

35 g of the dispersion liquid A, 1 g of divinylbenzene and 0.35 g of a polymerization initiator AIBN (azobisisobutyronitrile) were measured, sufficiently mixed together, and deaeration was performed for 10 minutes by an ultrasonic machine. This was added to the mixed liquid C, and emulsification was implemented by an emulsification machine. Next, this emulsified liquid was put into a bottle, the bottle was plugged with a silicone plug, an injection needle was used to sufficiently perform depressurization and deaeration, and nitrogen gas was enclosed. Next, it was reacted for 10 hours at 60° C. and particles were prepared. After cooling, this dispersion liquid was placed in a freeze-dry machine for two days under −35° C. and 0.1 Pa and the cyclohexane was removed. The obtained microparticle powder was dispersed in ion-exchange water, the calcium carbonate was dissolved by hydrochloric acid, and filtration was performed. Thereafter, the particles were cleaned with sufficient distilled water and dried. 2 parts per weight of the obtained particles were placed, together with 2 parts per weight of an ionic surfactant polyoxyethylene alkylether, in 98 parts per weight of silicone oil, stirred, dispersed, and a mixed liquid of the magenta color fourth colored particles 32C was prepared. The volume average particle diameter of the fourth colored particles 32C was 500 nm.

Figure 8:
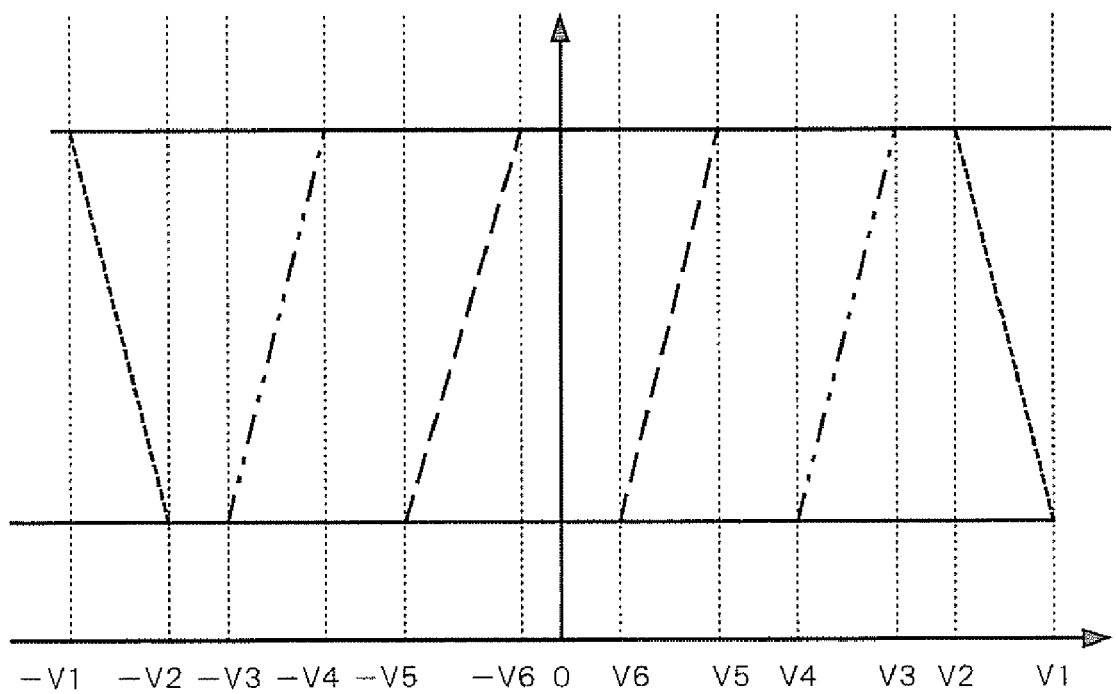
FIG. 8 is a diagram for describing an example of applied voltages that are necessary in order to cause first colored particles, third colored particles and fourth colored particles to move in the image display device pertaining to the third exemplary embodiment of the present invention.

Next, the charging characteristics of each of the particles pertaining to the third exemplary embodiment will be described. FIG. 8 is a diagram for describing an example of applied voltages that are necessary in order to cause the first colored particles 32A, the third colored particles 32C and the fourth colored particles 32D to move in the image display device pertaining to the third exemplary embodiment of the present invention.

In the present exemplary embodiment, the first colored particles 32A are negatively charged, the second colored particles 32Bs do not have a charging characteristic, the third colored particles 32C are negatively charged and the fourth colored particles 32D are positively charmed.

The voltage range that is necessary in order to cause the first colored particles 32A to move is set to $|V6 \leq V \leq V5|$ (absolute value of a value between V6 and V5), the voltage range that is necessary in order to cause the third colored particles 32C to move is set to $|V4 \leq V \leq V3|$ (absolute value of a value between V4 and V3), and the voltage range that is necessary in order to cause the fourth colored particles 32D to move is set to $|V2 \leq V \leq V1|$ (absolute value of a value between V2 and V1); the voltage ranges that are necessary in order for each of the colored particles to move are set in ranges that do not overlap and in mutually different voltage ranges. That is, the first colored particles 32A, the third colored particles 32C and the fourth colored particles 32D are configured to have respectively different charging characteristics.

Next, an example of drive control of the image display device pertaining to the third exemplary embodiment of the present invention configured as described above will be described. It will be noted that, below, in order to facilitate description, an example will be described where the back substrate 28 is grounded (0 V) and where a voltage is applied to the surface electrode 16.

First, when the voltage applicator 40 applies an applied voltage V (−V1) between the surface electrode 16 and the back electrode 22 by the control of the controller 42, the positively charged fourth colored particles 32D move toward the display substrate 18 and the negatively charged first colored particles 32A and third colored particles 32C move toward the back substrate 28 in a state where the second colored particles 32Bs that do not have a charging characteristic float. Thus, the state shown in FIG. 9(1) is reached, and the fourth colored particles 32D that are colored magenta become viewed from the display substrate 18. At this time, magenta color is displayed because the second colored particles 32Bs that are colored white are on the underside (back substrate 28 side) of the fourth colored particles 32D that are translucent.

Figure 9:
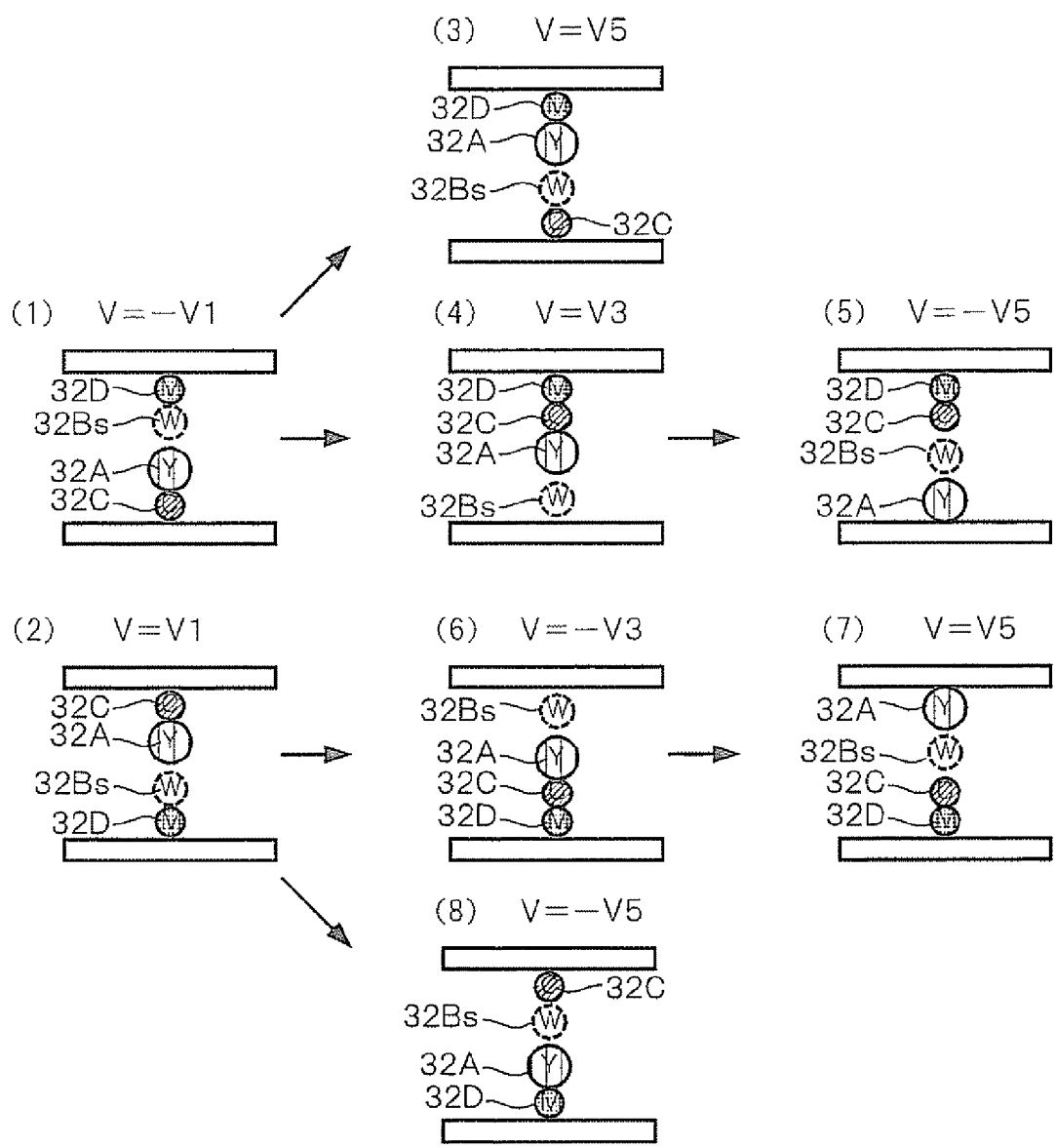
FIG. 9 is a diagram for describing drive control of the image display device pertaining to the third exemplary embodiment of the present invention.

Further, from the state shown in FIG. 9(2) (magenta color display state), when the voltage applicator 40 applies an applied voltage V (V5) between the surface electrode 16 and the back electrode 22 by the control of the controller 42, the first colored particles 32A move toward the display substrate 18 in a state where the second colored particles 32Bs that do not have a charging characteristic float. Thus, the state shown in FIG. 9(3) is reached, and magenta color becomes viewed. At this time, red color, which is a subtractive mixture of magenta color and yellow color, is displayed because the first colored particles 32A that are colored yellow are on the underside (back substrate 28 side) of the fourth colored particles 32D that are translucent.

Further, from the state shown in FIG. 9(1) (magenta color display state), when the voltage applicator 40 applies an applied voltage V (V3) between the surface electrode 16 and the back electrode 22 by the control of the controller 42, the third colored particles 32C and the first colored particles 32A move toward the display substrate 18 in a state where the second colored particles 32Bs that do not have a charging characteristic float. Thus, as shown in FIG. 9(4), the fourth colored particles 32D that are colored magenta become viewed from the display substrate 18 side. At this time, black color of a subtractive mixture of magenta color, cyan color and yellow color is displayed because the first colored particles 32A that are colored yellow are on the underside (back substrate 28 side) of the fourth colored particles 32D and the third colored particles 32C that are translucent.

Further, from the state shown in FIG. 9(4) (black color display state), when the voltage applicator 40 applies an applied voltage V (−V5) between the surface electrode 16 and the back electrode 22 by the control of the controller 42, the first colored particles 32A move toward the back substrate 28 in a state where the second colored particles 32Bs that do not have a charging characteristic float. Thus, the state shown in FIG. 9(5) is reached, and the fourth colored particles 32D that are colored magenta become viewed from the display substrate 18 side. At this time, blue color of a subtractive mixture of magenta color and cyan color is displayed because the third colored particles that are colored cyan are on the underside (back substrate 28 side) of the fourth colored particles 32D that are translucent and the second colored particles 32Bs that are colored white are on the underside (back substrate 28 side) of the third colored particles 32C that are translucent.

On the other hand, when the voltage applicator 40 applies an applied voltage V (V1) between the surface electrode 16 and the back electrode 22 by the control of the controller 42, the third colored particles 32C and the first colored particles 32A move toward the display substrate 18 in a state where the second colored particles 32Bs float. Further, the fourth colored particles 32D move toward the back substrate 28. Thus, the state shown in FIG. 9(2) is reached, and the third colored particles 32C that are colored cyan become viewed from the display substrate 18 side. At this time, green color of a subtractive mixture of cyan color and yellow color is displayed because the first colored particles 32A that are colored yellow are on the underside (back substrate 28 side) of the third colored particles 32C that are translucent and the second colored particles 32Bs that are colored white are on the underside (back substrate 28 side) of the first colored particles.

Further, from the state shown in FIG. 9(2) (green color display state), when the voltage applicator 40 applies an applied voltage V (−V3) between the surface electrode 16 and the back electrode 22 by the control of the controller 42, the third colored particles 32C and the first colored particles 32A move toward the back substrate 28 in a state where the second colored particles 32Bs that do not have a charging characteristic float. Thus, the state shown in FIG. 9(6) is reached, the floating second colored particles 312B become viewed from the display substrate 18 side, and white color is displayed.

Further, from the state shown in FIG. 9(6) (white color display state), when the voltage applicator 40 applies an applied voltage V (V5) between the surface electrode 16 and the back electrode 22 by the control of the controller 42, the first colored particles 32A move toward the display substrate 18 in a state where the second colored particles 32Bs that do not have a charging characteristic float. Thus, the state shown in FIG. 9(7) is reached, and the first colored particles 32A that are colored yellow are viewed from the display substrate 18 side. At this time, yellow color is displayed because the second colored particles 32Bs that are colored yellow are on the underside (back substrate 28 side) of the first colored particles 32A.

Further, from the state shown in FIG. 9(2) (green color display state), when the voltage applicator 40 applies an applied voltage V (−V5) between the surface electrode 16 and the back electrode 22 by the control of the controller 42, the first colored particles 32A move toward the back substrate 28 in a state where the second colored particles that do not have a charging characteristic float. Thus, the state shown in FIG. 9(8) is reached, and the third colored particles 32C that are colored cyan are viewed from the display substrate 18 side. At this time, cyan color is displayed because the second colored particles 32Bs that are colored white are on the underside (back substrate 28 side) of the third colored particles 32C that are translucent.

In this manner, even in a state where the second colored particles 32Bs float in the dispersion liquid 24 without having a charging characteristic, the third colored particles 32C and the fourth colored particles 32D are reliably layer-separated because they are configured to have opposite polarities, and the first colored particles 32A and the second colored particles 32Bs are also reliably layer-separated because the first colored particles 32A have a charging characteristic and the second colored particles 32Bs do not have a charging characteristic, so color mixing is prevented in color display.

Further, the image display device is disposed with the white color second colored particles 32Bs that float in the dispersion liquid 24 without hindering the movement of the first colored particles 32A, the third colored particles 32C and the fourth colored particles 32D. Further, the white color second colored particles 32Bs are positioned in back of the three types of colored particles (the first colored particles 32A, the third colored particles 32C and the fourth colored particles 32D) in response to image information. Therefore, high-quality color display where white color is higher than convention and no color mixing is performed.

Further, in the present exemplary embodiment also, 8-color display becomes possible by coloring the respective colored particles to white color, yellow color, cyan color and magenta color.

It will be noted that the particle diameters of the third colored particles 32C and the fourth colored particles 32D in the third exemplary embodiment may be the same or different. In the present exemplary embodiment, as mentioned above, the particle diameters of the first colored particles 32A, the third colored particles 32C and the fourth colored particles 32D are set to particle diameters such that the third colored particles 32C and the fourth colored particles 32D move through clearances between the first colored particles 32A and the second colored particles 32Bs in a state where the first colored particles 32A have aggregated together by an electric field that has formed between the substrates, but they may also be set to particle diameters such that only colored particles (the third colored particles 32C) that have the same polarity as that of the first colored particles 32A in a state where the first colored particles 32A have aggregated together move through the clearances between the first colored particles 32A in an aggregated state.

Fourth Exemplary Embodiment

Next, an image display device pertaining to a fourth exemplary embodiment of the present invention will be described. It will be noted that the fourth exemplary embodiment is a modification of the third exemplary embodiment and that just its charging characteristic is different, so just differences with respect to the third exemplary embodiment will be described.

Figure 10:
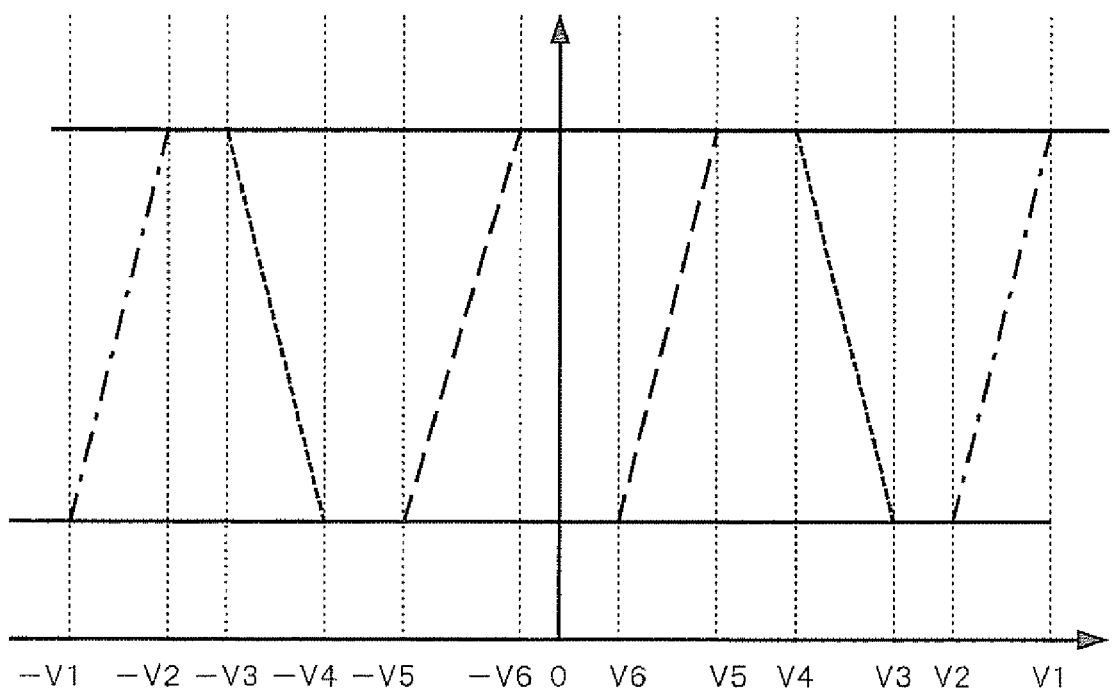
FIG. 10 is a diagram for describing an example of applied voltages that are necessary in order to cause first colored particles, third colored particles and fourth colored particles to move in the image display device pertaining to a fourth exemplary embodiment of the present invention.

FIG. 10 is a diagram for describing an example of applied voltages that are necessary in order to cause the first colored particles 32A, the third colored particles 32C and the fourth colored particles 32D to move in the image display device pertaining to the fourth exemplary embodiment of the present invention.

In the present exemplary embodiment also, the first colored particles 32A are negatively charged, the second colored particles 32Bs do not have a charging characteristic, the third colored particles 32C are negatively charged and the fourth colored particles 32D are positively charged.

In the present exemplary embodiment, the voltage range that is necessary in order to cause the first colored particles 32A to move is set to $|V6 \leq V \leq V5|$ (absolute value of a value between V6 and V5), the voltage range that is necessary in order to cause the third colored particles 32C to move is set to $|V2 \leq V \leq V1|$ (absolute value of a value between V2 and V1), and the voltage range that is necessary in order to cause the fourth colored particles 32D to move is set to $|V4 \leq V \leq V3|$ (absolute value of a value between V4 and V3); the voltage ranges that are necessary in order for each of the colored particles to move are set in ranges that do not overlap and in mutually different voltage ranges. That is, the first colored particles 32A, the third colored particles 32C and the fourth colored particles 32D are configured to have respectively different charging, characteristics.

Next, an example of drive control of the image display device pertaining to the fourth exemplary embodiment of the present invention configured as described above will be described. It will be noted that, below, in order to facilitate description, an example will be described where the back substrate 28 is grounded (0 V) and where a voltage is applied to the surface electrode 16.

First, when the voltage applicator 40 applies an applied voltage V (−V1) between the surface electrode 16 and the back electrode 22 by the control of the controller 42, the positively charged fourth colored particles 32D move toward the display substrate 18 and the negatively charged first colored particles 32A and third colored particles 32C move toward the back substrate 28 in a state where the second colored particles 32Bs that do not have a charging characteristic float. Thus, the state shown in FIG. 11(1) is reached, and the fourth colored particles 32D that are colored magenta become viewed from the display substrate 18. At this time, magenta color is displayed because the second colored particles 32Bs that are colored white are on the underside (back substrate 28 side) of the fourth colored particles 32D that are translucent.

Figure 11:
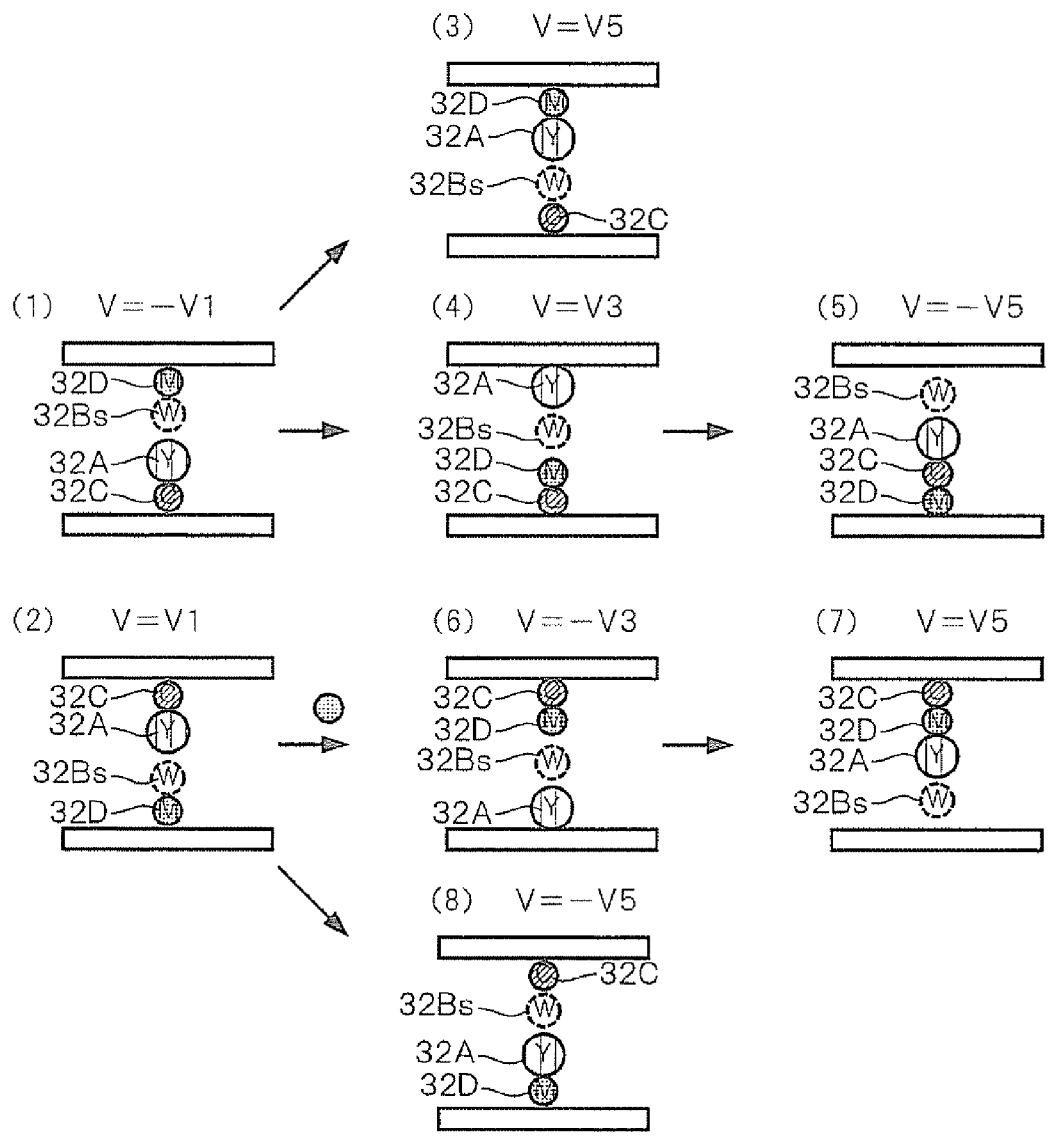
FIG. 11 is a diagram for describing drive control of the image display device pertaining to the fourth exemplary embodiment of the present invention.

Further, from the state shown in FIG. 11(1) (magenta color display state), when the voltage applicator 40 applies an applied voltage V (V5) between the surface electrode 16 and the back electrode 22 by the control of tile controller 42, the first colored particles 32A move toward the display substrate 18 in a state where the second colored particles 32Bs that do not have a charging characteristic float. Thus, the state shown in FIG. 11(3) is reached, and magenta color becomes viewed. At this time, red color, which is a subtractive mixture of magenta color and yellow color, is displayed because the first colored particles 32A that are colored yellow are on the underside (back substrate 28 side) of the fourth colored particles 32D that are translucent.

Further, from the state shown in FIG. 11(1) (magenta color display state), when the voltage applicator 40 applies an applied voltage V (V3) between the surface electrode 16 and the back electrode 22 by the control of the controller 42, the first colored particles 32A move toward the display substrate 18 and the fourth colored particles 32D move toward the back substrate 28 in a state where the second colored particles 32Bs that do not have a charging characteristic float. Thus, as shown in FIG. 11(4), the first colored particles 32A that are colored yellow become viewed from the display substrate 18 side. At this time, yellow color is displayed because the second colored particles 32Bs that are colored white color are on the underside (back substrate 28 side) of the first colored particles 32A.

Further, from the state shown in FIG. 11(4) (yellow color display state), when the voltage applicator 40 applies an applied voltage V (−V5) between the surface electrode 16 and the back electrode 22 by the control of the controller 42, the first colored particles 32A move toward the back substrate 28 in a state where the second colored particles 32Bs that do not have a charging characteristic float. Thus, the state shown in FIG. 11(5) is reached, the first colored particles 32A that are colored white become viewed from the display substrate 18 side, and white color is displayed.

On the other hand, when the voltage applicator 40 applies an applied voltage V (V1) between the surface electrode 16 and the back electrode 22 by the control of the controller 42, the third colored particles 32C and the first colored particles 32A move toward the display substrate 18 in a state where the second colored particles 32Bs float. Further, the fourth colored particles 32D move toward the back substrate 28. Thus, the state shown in FIG. 11(2) is reached, and the third colored particles 32C that are colored cyan become viewed from the display substrate 18 side. At this time, green color of a subtractive mixture of cyan color and yellow color is displayed because the first colored particles 32A that are colored yellow are on the underside (back substrate 28 side) of the third colored particles 32C that are translucent and the second colored particles 32Bs that are colored white are on the underside (back substrate 28 side) of the first colored particles.

Further, from the state shown in FIG. 11(2) (green color display state), when the voltage applicator 40 applies an applied voltage V (−V3) between the surface electrode 16 and the back electrode 22 by the control of the controller 42, the fourth colored particles 32D move toward the display substrate 18 and the first colored particles 32A move toward the back substrate 28 in a state where the second colored particles 32Bs that do not have a charging characteristic float. Thus, the state shown in FIG. 11(6) is reached, and the third colored particles 32C that are colored cyan become viewed from the display substrate 18 side. At this time, blue color of a subtractive mixture of cyan color and magenta color is displayed because the fourth colored particles 32D that are colored magenta are on the underside (back substrate 28 side) of the third colored particles 32C that are translucent.

Further, from the state shown in FIG. 11(6) (blue color display state), when the voltage applicator 40 applies an applied voltage V (V5) between the surface electrode 16 and the back electrode 22 by the control of the controller 42, the first colored particles 32A move toward the display substrate 18 in a state where the second colored particles 32Bs that do not have a charging characteristic float. Thus, the state shown in FIG. 11(7) is reached, and the third colored particles 32C that are colored cyan become viewed from the display substrate 18 side. At this time, black color of a subtractive mixture of cyan color, magenta color and yellow color is displayed because the first colored particles 32A that are colored yellow are on the underside (back substrate 28 side) of the third colored particles 2C and the fourth colored particles 32D that are translucent.

Further, from the state shown in FIG. 11(2) (green color display state), when the voltage applicator 40 applies an applied voltage V (−V5) between the surface electrode 16 and the back electrode 22 by the control of the controller 42, the first colored particles 32A move toward the back substrate 28 in a state where the second colored particles that do not have a charging characteristic float. Thus, the state shown in FIG. 11(8) is reached, and the third colored particles 32C that are colored cyan are viewed from the display substrate 18 side. At this time, cyan color is displayed because the second colored particles 32Bs that are colored white are on the underside (back substrate 28 side) of the third colored particles 32C that are translucent.

In this manner, even when the charging characteristics of the third colored particles 32C and the fourth colored characteristics 32D are changed with respect to the third exemplary embodiment, the third colored particles 32C and the fourth colored particles 32D are reliably layer-separated because they are configured to have opposite polarities, and the first colored particles 32A and the second colored particles 32Bs are also reliably layer-separated because the first colored particles 32A have a charging characteristic and the second colored particles 32Bs do not have a charging characteristic, so color mixing is prevented in color display.

Further, the third exemplary embodiment has the characteristic that it is difficult for aggregation of each of the colored particles to occur with respect to the fourth exemplary embodiment. In other hand, the fourth exemplary embodiment has the characteristic that there is memorability with respect to the third exemplary embodiment.

It will be noted that the particle diameters of the third colored particles 32C and the fourth colored particles 32D in the third exemplary embodiment may be the same or different. The present exemplary embodiment is a modification of the third exemplary embodiment, so the particle diameters of the first colored particles 32A, the third colored particles 32C and the fourth colored particles 32D are set to particle diameters such that the third colored particles 32C and the fourth colored particles 32D move through the clearances between the first colored particles 32A and the second colored particles 32Bs in a state where the first colored particles 32A have aggregated together by an electric field that has formed between the substrates, but they may also be set to particle diameters such that only colored particles (the third colored particles 32C) that have the same polarity as that of the first colored particles 32A in a state where the first colored particles 32A have aggregated together move through the clearances between the first colored particles 32A in an aggregated state.

Fifth Exemplary Embodiment

Figure 12:
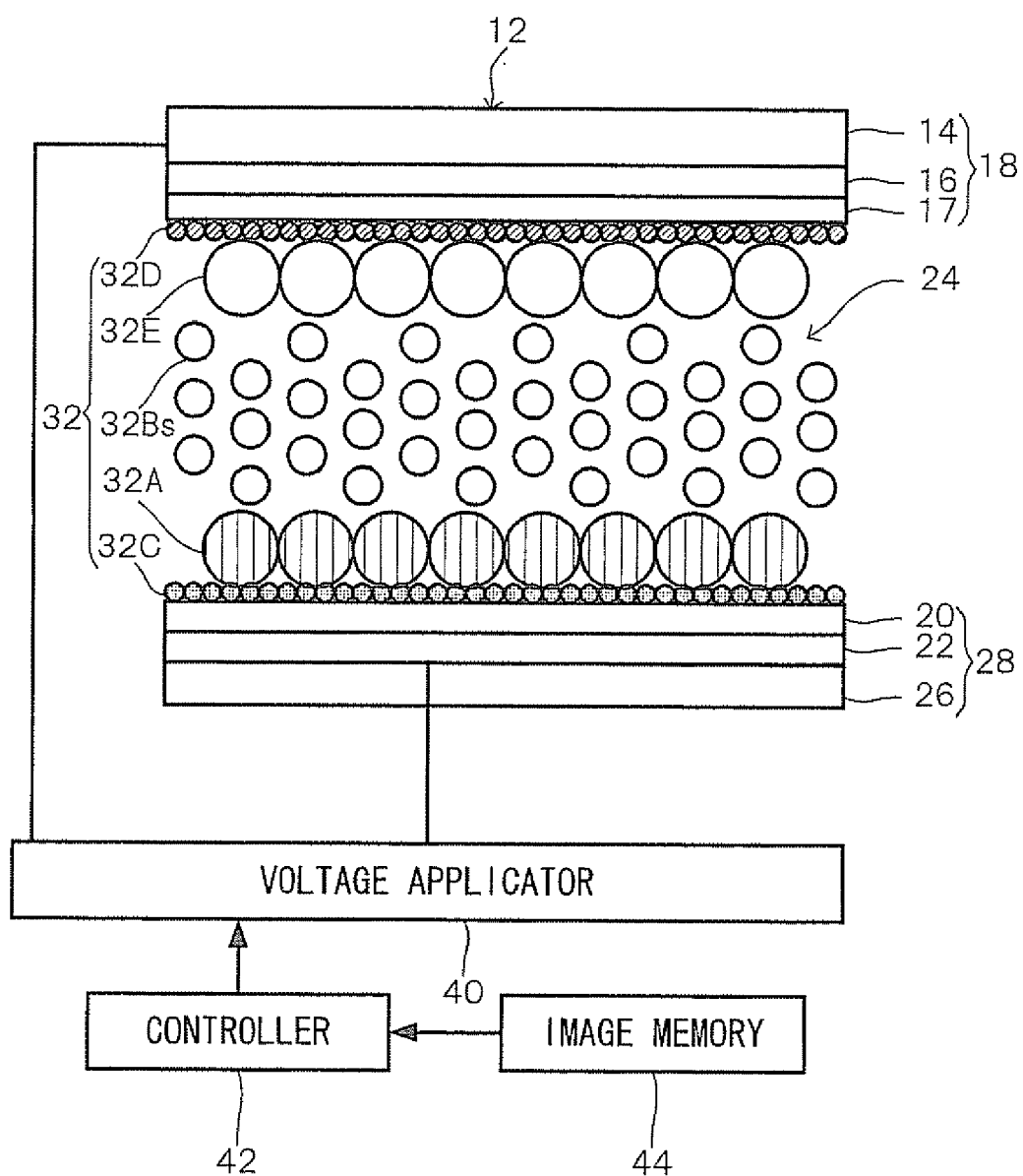
FIG. 12 is a diagram showing the configuration of an image display device pertaining to a fifth exemplary embodiment of the present invention.

Next, an image display device pertaining to a fifth exemplary embodiment of the present invention will be described. FIG. 12 is a diagram showing the configuration of the image display device pertaining to the fifth exemplary embodiment of the present invention. It will be noted that the fifth exemplary embodiment is a modification of the third exemplary embodiment or the fourth exemplary embodiment and that the same reference numerals will be given and described in regard to the same configurations.

In the fifth exemplary embodiment, the image display device further includes, with respect to the third exemplary embodiment or the fourth exemplary embodiment, fifth colored particles 32E that are colored white and are charged to the opposite polarity of the first colored particles 32A.

In the present exemplary embodiment, the particle diameter of the fifth colored particles 32E is about the same as the particle diameter of the first colored particles 32A, but it may also be a different particle diameter.

As for the charging characteristics of each of the particles in the present exemplary embodiment, the charging characteristics of the first to fourth colored particles 32 of the second exemplary embodiment may be applied to the first colored particles 32A, the third colored particles 32C, the fourth colored particles 32D and the fifth colored particles 32E. Further, in the second exemplary embodiment, the voltages that are necessary in order to move the colored particles with large particle diameters (the first colored particles 32A and the second colored particles 32B) are configured to be larger than the voltages that are necessary in order to move the third colored particles 32C and the fourth colored particles 32D. However, the voltages that are necessary in order to move the first colored particles 32A and the fifth colored particles 32E may also be configured to be smaller than the voltages that are necessary in order to move the third colored particles 32C and the fourth colored particles 32D.

Whatever the charging characteristics, by ensuring that the first colored particles 32A and the fifth colored particles 32E are opposite polarities and that the third colored particles 32C and the fourth colored particles 32D are opposite polarities, when a voltage is applied, the first colored particles 32A and the fifth colored particles 32E can be separated from each other and the third colored particles 32C and the fourth colored particles 32D can be separated from each other, color mixing is prevented in color display.

Incidentally, in the image display device of the first exemplary embodiment and the second exemplary embodiment, in order to raise the whiteness degree, it is necessary to include a white color pigment with a high specific gravity in comparison to other pigments, as a result of which there is a risk of specific gravity becoming high and of the pigment settling. Further, it is conceivable to increase the amount of the enclosed particles that are colored white and form them in two layers; however, although the colored particles are able to be held on the substrate surfaces by a mirror image force or the like that acts on the substrate surfaces in the case of a single layer, the holding force becomes weaker from the second layer on. Moreover, in the image display device of the third exemplary embodiment and the fourth exemplary embodiment, while there is no problem of settling because the second colored particles 32Bs that are colored white float, in order to further raise the whiteness degree, it is necessary to increase the amount of the second colored particles 32Bs. However, when the amount of the second colored particles 32Bs is greatly increased, a secondary problem arises whereby the viscosity of the liquid rises and display responsiveness is reduced.

In contrast, in the present exemplary embodiment, the image display device further includes the white color fifth colored particles 32E with respect to the third exemplary embodiment or the fourth exemplary embodiment, so the whiteness degree improves because of the floating second colored particles 32Bs and the fifth colored particles 32E, and a balance between memorability and whiteness degree becomes possible.

The second colored particles 32Bs that are colored white and float in the dispersion liquid 24 in the third to fifth exemplary embodiments have been described in each of these embodiments as not having a charging characteristic. However, it is acceptable for the second colored particles 32Bs not to be particles that have absolutely no charging characteristic, and the second colored particles 32Bs may also be slightly charged and move slightly to the extent that they do not affect display during driving.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image display medium comprising:
    a pair of substrates, at least one of which is translucent;
    a liquid that is enclosed between the substrates;
    first colored particles that are colored a first color, are dispersed in the liquid, and move in response to an electric field that is formed between the substrates;
    second colored particles that are colored a second color that is different from the first color, are dispersed in the liquid, and move in an opposite direction of the first colored particles; and
    third colored particles that are colored a third color that is different from the first color and the second color, are dispersed in the liquid, are configured to have a particle diameter such that the third colored particles move through clearances between the first colored particles and the second colored particles in a state where the first colored particles and the second colored particles have aggregated together, and move in response to an electric field that is formed between the substrates.

2. The image display medium of claim 1, wherein the third color is a complimentary color with respect to the first color or the second color.

3. The image display medium of claim 1, wherein the third colored particles are translucent.

4. The image display medium of claim 1, wherein the first color or the second color is white.

5. The image display medium of claim 1, wherein the first colored particles and the second colored particles include charging characteristics of opposite polarities.

6. The image display medium of claim 1, wherein the second colored particles do not have a charging characteristic and move in an opposite direction of the first colored particles by the movement of the first colored particles.

7. The image display medium of claim 1, wherein the first colored particles and the second colored particles fill the liquid in a volume filling fraction of about 10% to about 60%.

8. The image display medium of claim 1, further comprising fourth colored particles that are colored a fourth color that is different from the first to third colors, are dispersed in the liquid, are configured to have a particle diameter such that the fourth colored particles move through clearances between the first colored particles and the second colored particles in a state where the first colored particles and the second colored particles have aggregated together, include a charging characteristic that is different from that of the third colored particles, and move in response to an electric field that is formed between the substrates.

9. The image display medium of claim 8, wherein the third colored particles and the fourth colored particles include charging characteristics of opposite polarities.

10. The image display medium of claim 8, wherein the first to fourth colors are white, yellow, magenta and cyan.

11. An image display medium comprising:
    a pair of substrates, at least one of which is translucent;
    a liquid that is enclosed between the substrates;
    first colored particles that are colored a first color, are dispersed in the liquid, and move in response to an electric field that is formed between the substrates;
    second colored particles that are colored a second color that is different from the first color, are dispersed in the liquid, and move relatively in an opposite direction with respect to the first colored particles; and
    third colored particles that are colored a third color that is different from the first color and the second color, are dispersed in the liquid, are configured to have a particle diameter such that the third colored particles move through clearances between the first colored particles and the second colored particles in a state where at least one of the first colored particles and the second colored particles have aggregated together, and move in response to an electric field that is formed between the substrates.

12. The image display medium of claim 11, wherein the third color is a complimentary color with respect to the first color or the second color.

13. The image display medium of claim 11, wherein the third colored particles are translucent.

14. The image display medium of claim 11, wherein the first color or the second color is white.

15. The image display medium of claim 11, wherein the first colored particles and the second colored particles include charging characteristics of opposite polarities.

16. The image display medium of claim 11, wherein the second colored particles do not have a charging characteristic and move in an opposite direction of the first colored particles by the movement of the first colored particles.

17. The image display medium of claim 11, wherein the first colored particles and the second colored particles fill the liquid in a volume filling fraction of about 10% to about 60%.

18. The image display medium of claim 11, further comprising fourth colored particles that are colored a fourth color that is different from the first to third colors, are dispersed in the liquid, are configured to have a particle diameter such that the fourth colored particles move through clearances between the first colored particles and the second colored particles in a state where the first colored particles and the second colored particles have aggregated together, include a charging characteristic that is different from that of the third colored particles, and move in response to an electric field that is formed between the substrates.

19. The image display medium of claim 18, wherein the third colored particles and the fourth colored particles include charging characteristics of opposite polarities.

20. The image display medium of claim 18, wherein the first to fourth colors are white color, yellow color, magenta color and cyan color.

21. An image display medium comprising:
a pair of substrates, at least one of which is translucent;
a liquid that is enclosed between the substrates;
first colored particles that are colored a first color, are dispersed in the liquid, and move in response to an electric field that is formed between the substrates;
second colored particles that are colored a second color that is different from the first color and are dispersed in the liquid;
third colored particles that are colored a third color that is different from the first color and the second color, are dispersed in the liquid, are configured to have a particle diameter such that the third colored particles move through clearances between the first colored particles and the second colored particles in a state where the first colored particles have aggregated together, and move in response to an electric field that is formed between the substrates; and
fourth colored particles that are colored a fourth color that is different from the first to third colors, are dispersed in the liquid, are configured to have a particle diameter such that the fourth colored particles move through clearances between the first colored particles and the second colored particles in a state where the first colored particles have aggregated together, and move in response to an electric field that is formed between the substrates.

22. The image display medium of claim 21, wherein the second colored particles are white.

23. The image display medium of claim 21, wherein the first colored particles, the third colored particles and the fourth colored particles include voltage ranges that are necessary in order for the first colored particles, the third colored particles and the fourth colored particles to move in response to an electric field, and the voltage ranges are respectively set to ranges that do not overlap therebetween.

24. The image display medium of claim 21, further comprising fifth colored particles that are colored white, are dispersed in the liquid, and move in response to an electric field that is formed between the substrates, wherein the third colored particles and the fourth colored particles are configured to have particle diameters where the third colored particles and the fourth colored particles move through clearances between the first colored particles and the fifth colored particles in a state where the first colored particles and the fifth colored particles have aggregated together.

25. The image display medium of claim 21, wherein the voltage that is necessary in order to cause the first colored particles to move is smaller than the voltages that are necessary in order to cause the third colored particles and the fourth colored particles to move.

26. An image display medium comprising:
a pair of substrates, at least one of which is translucent;
a liquid that is enclosed between the substrates;
first colored particles that are colored a first color, are dispersed in the liquid, and move in response to an electric field that is formed between the substrates;
second colored particles that are colored a second color that is different from the first color and are dispersed in the liquid;
third colored particles that are colored a third color that is different from the first color and the second color, are dispersed in the liquid, and move in an opposite direction of the first colored particles in response to an electric field that is formed between the substrates; and
fourth colored particles that are colored a fourth color that is different from the first to third colors, are dispersed in the liquid, are configured to have a particle diameter such that the fourth colored particles move through clearances between the first colored particles and the second colored particles in a state where the first colored particles have aggregated together, and move in the same direction as the first colored particles in response to an electric field that is formed between the substrates.

27. The image display medium of claim 26, wherein the second colored particles are white.

28. The image display medium of claim 26, wherein the first colored particles, the third colored particles and the fourth colored particles include voltage ranges that are necessary in order for the first colored particles, the third colored particles and the fourth colored particles to move in response to an electric field, and the voltage ranges are respectively set to ranges that do not overlap therebetween.

29. The image display medium of claim 26, further comprising fifth colored particles that are colored white, are dispersed in the liquid, and move in response to an electric field that is formed between the substrates, wherein the third colored particles and the fourth colored particles are configured to have particle diameters where the third colored particles and the fourth colored particles move through clearances between the first colored particles and the fifth colored particles in a state where the first colored particles and the fifth colored particles have aggregated together.

30. The image display medium of claim 26, wherein the voltage that is necessary in order to cause the first colored particles to move is smaller than the voltages that are necessary in order to cause the third colored particles and the fourth colored particles to move.

31. An image display device comprising:
a pair of substrates, at least one of which is translucent;
a liquid that is enclosed between the substrates;
first colored particles that are colored a first color, are dispersed in the liquid, and move in response to an electric field that is formed between the substrates;
second colored particles that are colored a second color that is different from the first color, are dispersed in the liquid, and move in an opposite direction of the first colored particles;
third colored particles that are colored a third color that is different from the first color and the second color, are dispersed in the liquid, are configured to have a particle diameter such that the third colored particles move through clearances between the first colored particles and the second colored particles in a state where the first colored particles and the second colored particles have aggregated together, and move in response to an electric field that is formed between the substrates;
a voltage applicator that applies a voltage between the substrates; and
a controller that controls the voltage applicator in response to image information.

32. An image display device comprising:
a pair of substrates, at least one of which is translucent;
a liquid that is enclosed between the substrates;
first colored particles that are colored a first color, are dispersed in the liquid, and move in response to an electric field that is formed between the substrates;
second colored particles that are colored a second color that is different from the first color, are dispersed in the liquid, and move in an opposite direction of the first colored particles;
third colored particles that are colored a third color that is different from the first color and the second color, are dispersed in the liquid, are configured to have a particle diameter such that the third colored particles move through clearances between the first colored particles and the second colored particles in a state where the first colored particles and the second colored particles have aggregated together, and move in response to an electric field that is formed between the substrates;
fourth colored particles that are colored a fourth color that is different from the first to third colors, are dispersed in the liquid, are configured to have a particle diameter such that the fourth colored particles move through clearances between the first colored particles and the second colored particles in a state where the first colored particles and the second colored particles have aggregated together, include a charging characteristic that is different from that of the third colored particles, and move in response to an electric field that is formed between the substrates;
a voltage applicator that applies a voltage between the substrates; and
a controller that controls the voltage applicator in response to image information.

33. An image display device comprising:
a pair of substrates, at least one of which is translucent;
a liquid that is enclosed between the substrates;
first colored particles that are colored a first color, are dispersed in the liquid, and move in response to an electric field that is formed between the substrates;
second colored particles that are colored a second color that is different from the first color, are dispersed in the liquid, and move in an opposite direction relatively with respect to the first colored particles;
third colored particles that are colored a third color that is different from the first color and the second color, are dispersed in the liquid, are configured to have a particle diameter such that the third colored particles move through clearances between the first colored particles and the second colored particles in a state where at least one of the first colored particles and the second colored particles have aggregated together, and move in response to an electric field that is formed between the substrates;
fourth colored particles that are colored a fourth color that is different from the first to third colors, are dispersed in the liquid, are configured to have a particle diameter such that the fourth colored particles move through clearances between the first colored particles and the second colored particles in a state where at least one of the first colored particles and the second colored particles have aggregated together, include a charging characteristic that is different from that of the third colored particles, and move in response to an electric field that is formed between the substrates;
a voltage applicator that applies a voltage between the substrates; and
a controller that controls the voltage applicator in response to image information.

34. An image display device comprising:
a pair of substrates, at least one of which is translucent;
a liquid that is enclosed between the substrates;
first colored particles that are colored a first color, are dispersed in the liquid, and move in response to an electric field that is formed between the substrates;
second colored particles that are colored a second color that is different from the first color, are dispersed in the liquid, and move in an opposite direction relatively with respect to the first colored particles;
third colored particles that are colored a third color that is different from the first color and the second color, are dispersed in the liquid, are configured to have a particle diameter such that the third colored particles move through clearances between the first colored particles and the second colored particles in a state where at least one of the first colored particles and the second colored particles have aggregated together, and move in response to an electric field that is formed between the substrates;
a voltage applicator that applies a voltage between the substrates; and
a controller that controls the voltage applicator in response to image information.

35. An image display device comprising:
a pair of substrates, at least one of which is translucent;
a liquid that is enclosed between the substrates;
first colored particles that are colored a first color, are dispersed in the liquid, and move in response to an electric field that is formed between the substrates;
second colored particles that are colored a second color that is different from the first color and are dispersed in the liquid;
third colored particles that are colored a third color that is different from the first color and the second colors are dispersed in the liquid, are configured to have a particle diameter such that the third colored particles move through clearances between the first colored particles and the second colored particles in a state where the first colored particles have aggregated together, and move in response to an electric field that is formed between the substrates;
fourth colored particles that are colored a fourth color that is different from the first to third colors, are dispersed in the liquid, are configured to have a particle diameter such that the fourth colored particles move through clearances between the first colored particles and the second colored particles in a state where the first colored particles have aggregated together, and move in response to an electric field that is formed between the substrates;
a voltage applicator that applies a voltage between the substrates; and
a controller that controls the voltage applicator in response to image information.

36. An image display device comprising:
a pair of substrates, at least one of which is translucent;
a liquid that is enclosed between the substrates;
first colored particles that are colored a first color, are dispersed in the liquid, and move in response to an electric field that is formed between the substrates;
second colored particles that are colored a second color that is different from the first color and are dispersed in the liquid;

third colored particles that are colored a third color that is different from the first color and the second color, are dispersed in the liquid, and move in an opposite direction of the first colored particles in response to an electric field that is formed between the substrates;

fourth colored particles that are colored a fourth color that is different from the first to third colors, are dispersed in the liquid, are configured to have a particle diameter such that the fourth colored particles move through clearances between the first colored particles and the second colored particles in a state where the first colored particles have aggregated together, and move in the same direction as the first colored particles in response to an electric field that is formed between the substrates;

a voltage applicator that applies a voltage between the substrates; and a controller that controls the voltage applicator in response to image information.

* * * * *